(12) United States Patent
Matsumoto et al.

(10) Patent No.: US 7,004,487 B2
(45) Date of Patent: Feb. 28, 2006

(54) CONTINUOUSLY VARIABLE TRANSMISSION FOR BICYCLES

(75) Inventors: Shinya Matsumoto, Saitama (JP); Naoki Inoue, Saitama (JP); Yoshiaki Tsukada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 301 days.

(21) Appl. No.: 10/401,757

(22) Filed: Mar. 31, 2003

(65) Prior Publication Data

US 2003/0221892 A1      Dec. 4, 2003

(30) Foreign Application Priority Data

May 31, 2002    (JP)    .............................. 2002-160804

(51) Int. Cl.
*B62M 9/00*     (2006.01)
(52) U.S. Cl. ............................. 280/259; 74/65; 74/119; 280/236
(58) Field of Classification Search ................ 280/259, 280/260, 261, 262, 236; 74/65, 66, 117, 74/119

See application file for complete search history.

(56) References Cited

U.S. PATENT DOCUMENTS 5,873,590 A * 2/1999 Abe et al. ................... 280/259

FOREIGN PATENT DOCUMENTS

| FR | 2 596 840 A1 | 10/1987 |
|---|---|---|
| GB | 1 541 281 | 2/1979 |
| JP | 54-120146 A | 9/1979 |
| WO | WO 01/15963 A1 | 3/2001 |

* cited by examiner

*Primary Examiner*—Anne Marie Boehler
(74) *Attorney, Agent, or Firm*—Birch, Stewart, Kolasch & Birch, LLP

(57) ABSTRACT

A continuously variable transmission for bicycles having a transmission mechanism including a plurality of link units for converting rotary motion of an input shaft rotated by a pedal-operated crankshaft into swinging motion, and a one-way clutch for converting the swinging motion into rotary motion of an output shaft. The link units have drive links pivotally mounted on an eccentric ring which rotates in unison with the input shaft. The continuously variable transmission is disposed between a front wheel and a rear wheel of a bicycle in the longitudinal direction thereof and disposed either upwardly of a hypothetical plane which contains the axes of rotation of the front wheel and the rear wheel or upwardly of a position below and near the hypothetical plane. The transmission so configured provides better bicycle maneuverability, lower cost, while suffering almost no danger of contacting the ground.

20 Claims, 15 Drawing Sheets

ANGULAR DISPLACEMENT OF INPUT SHAFT

ANGULAR DISPLACEMENT OF INPUT SHAFT

CONTINUOUSLY VARIABLE TRANSMISSION FOR BICYCLES

CROSS-REFERENCE TO RELATED APPLICATION

The present application claims priority under 35 U.S.C. §119 to Japanese Patent Application No. 2002-160804, filed May 31, 2002, the entire contents of which are hereby incorporated by reference.

BACKGROUND OF THE INVENTION

1. Field of the Invention

The present invention relates to a continuously variable transmission for bicycles, and more particularly to a continuously variable transmission including a plurality of link units for converting rotary motion of an input shaft into swinging motion, a one-way clutch for converting the swinging motion into rotary motion of an output shaft, and a transmission control mechanism for continuously varying the rotational speed of the output shaft.

2. Description of Background Art

There has heretofore been known a continuously variable transmission for bicycles of the type described above, as disclosed in Japanese patent laid-open No. Sho 54-120146. This continuously variable transmission, which is disposed near the axle of the rear wheel, has a crankshaft rotatable by a torque transmitted from a drive sprocket of a pedal through a chain to a driven sprocket, a crank rod pivotally supported on an eccentric pin of the crankshaft, a one-way clutch disposed on a countershaft, and a feed rod having an end pivotally mounted on a drive member of the one-way clutch and another end pivotally mounted on the crank rod. Also included are an output shaft to which rotation of the countershaft is transmitted, a coupling pin coupling the crank rod and the feed rod to each other, a turning member with which a pivot shaft is integral, and a link having an end pivotally mounted on the coupling pin and another end pivotally mounted on the pivot shaft. The turning member is swung to change the position of the pivot shaft for thereby continuously varying a speed change ratio.

According to the above reference, since the transmission which is a heavy object is positioned near the axle of the rear wheel which is spaced from the center of gravity of the bicycle body, the maneuverability of the bicycle is poor. Furthermore, since a portion of the transmission is positioned below the axle, it may possibly contact the ground when the bicycle travels on rough terrain. If the drive sprocket which also serves as a speed increasing mechanism for increasing the rotational speed of the crankshaft of the continuously variable transmission is of a large diameter, then it may also possibly contact the ground. Further, a difficulty arises in that the layout of the speed increasing mechanism with respect to the bicycle frame suffers reduced freedom. If the range of angular movement of the crank rod is changed to change the range of speed change ratios depending on the type of the bicycle or due to specification changes, then the crankshaft itself needs to be replaced, resulting in an increase in the cost of the continuously variable transmission.

SUMMARY AND OBJECTS OF THE INVENTION

The present invention has been made in view of the above problems. One object of the present invention is to provide a continuously variable transmission for bicycles which provides better bicycle maneuverability, and suffers almost no danger of contacting the ground, while reducing cost. Another object of the present invention is to prevent contact of the continuously variable transmission and the drive rotor with the ground. A third object of the present invention defined is to reduce the size of the speed increasing mechanism, thus increasing the freedom of the layout thereof with respect to a bicycle frame.

According to a first aspect of the present invention, there is provided a continuously variable transmission for bicycles which includes a transmission mechanism having a plurality of link units, each having a plurality of transmission links, for converting rotary motion of an input shaft rotated by a pedal-operated crankshaft into swinging motion, a one-way clutch coupled to each of the link units for converting the swinging motion of the link units into rotary motion of an output shaft, and a transmission control mechanism for moving an end of a transmission control link having an opposite end pivotally coupled to each of the link units thereby to continuously vary the rotational speed of the output shaft.

The continuously variable transmission also includes a drive link of the transmission links of each of the link units which is pivotally supported on an eccentric ring coupled to the input shaft for rotation in unison therewith, the continuously variable transmission being disposed between front and rear wheels of a bicycle in a longitudinal direction thereof and either upwardly of a hypothetical plane which contains the axis of rotation of the front wheel and the axis of rotation of the rear wheel or upwardly of a position below and near the hypothetical plane.

With above arrangement, replacing the eccentric ring makes it possible to change the range of angular movement of the drive link to change the range of speed change ratios easily without the need for replacing the input shaft. The continuously variable transmission is positioned closer to the center of gravity of the bicycle body and remoter from the ground than with conventional transmissions.

As a result, the present invention offers the following advantages: Because the continuously variable transmission is disposed between the front and rear wheels of the bicycle and either upwardly of the hypothetical plane which contains the axes of rotation of the front and rear wheels or upwardly of a position below and near the hypothetical plane, the bicycle has better maneuverability, and the continuously variable transmission suffers almost no danger of contacting the ground.

Since the drive link of the transmission links of each of the link units is pivotally supported on the eccentric ring coupled to the input shaft, even if the range of angular movement of the drive link is changed to change the range of speed change ratios depending on the type of the bicycle or due to specification changes, the range of speed change ratios can easily be changed by replacing the eccentric ring. Inasmuch as the input shaft can be used as a common part, the cost of the continuously variable transmission can be reduced.

According to a second aspect of the present invention, a drive rotor on which an endless transmission belt for transmitting power is trained is coupled to an end of the output shaft outside of a case of the continuously variable transmission, the drive rotor and the continuously variable transmission being disposed upwardly of a lowermost end of a bicycle frame.

With the above arrangement, the drive rotor positioned outside of the continuously variable transmission and the continuously variable transmission are prevented from contacting the ground by the lowermost end of the bicycle frame which is positioned below the drive rotor and the continuously variable transmission.

As a result, the present invention offers the following additional advantage: Because the drive rotor coupled to the end of the output shaft outside of the case of the continuously variable transmission and the continuously variable transmission are disposed upwardly of the lowermost end of the bicycle frame, it is possible to further avoid contact of the continuously variable transmission and the drive rotor with the ground.

According to a third aspect of the present invention, the crankshaft, an idle shaft disposed parallel to the crankshaft, and a speed increasing gear train which is mounted on the crankshaft, and the idle shaft for increasing the rotational speed of the crankshaft and transmitting the rotation at the increased speed to the input shaft are disposed in a case of the continuously variable transmission.

Thus, a speed increasing mechanism for increasing the rotational speed of the crankshaft and transmitting the rotation at the increased speed to the input shaft includes a speed increasing gear train mounted on the crankshaft and the idle shaft in the case of the continuously variable transmission.

As a result, the invention following additional advantages: Because the speed increasing gear train mounted on the crankshaft and the idle shaft for increasing the rotational speed of the crankshaft and transmitting the rotation at the increased speed to the input shaft is disposed in the case of the continuously variable transmission, the speed increasing mechanism is made compact, and the layout of the speed increasing mechanism with respect to the bicycle frame and hence the layout of the continuously variable transmission with respect to the bicycle frame have increased freedom.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and from the accompanying drawings, which are given by way of illustration only, and thus are not limitative of the present invention, and wherein.

DETAILED DESCRIPTION OF THE PREFERRED EMBODIMENTS

Figure 1:
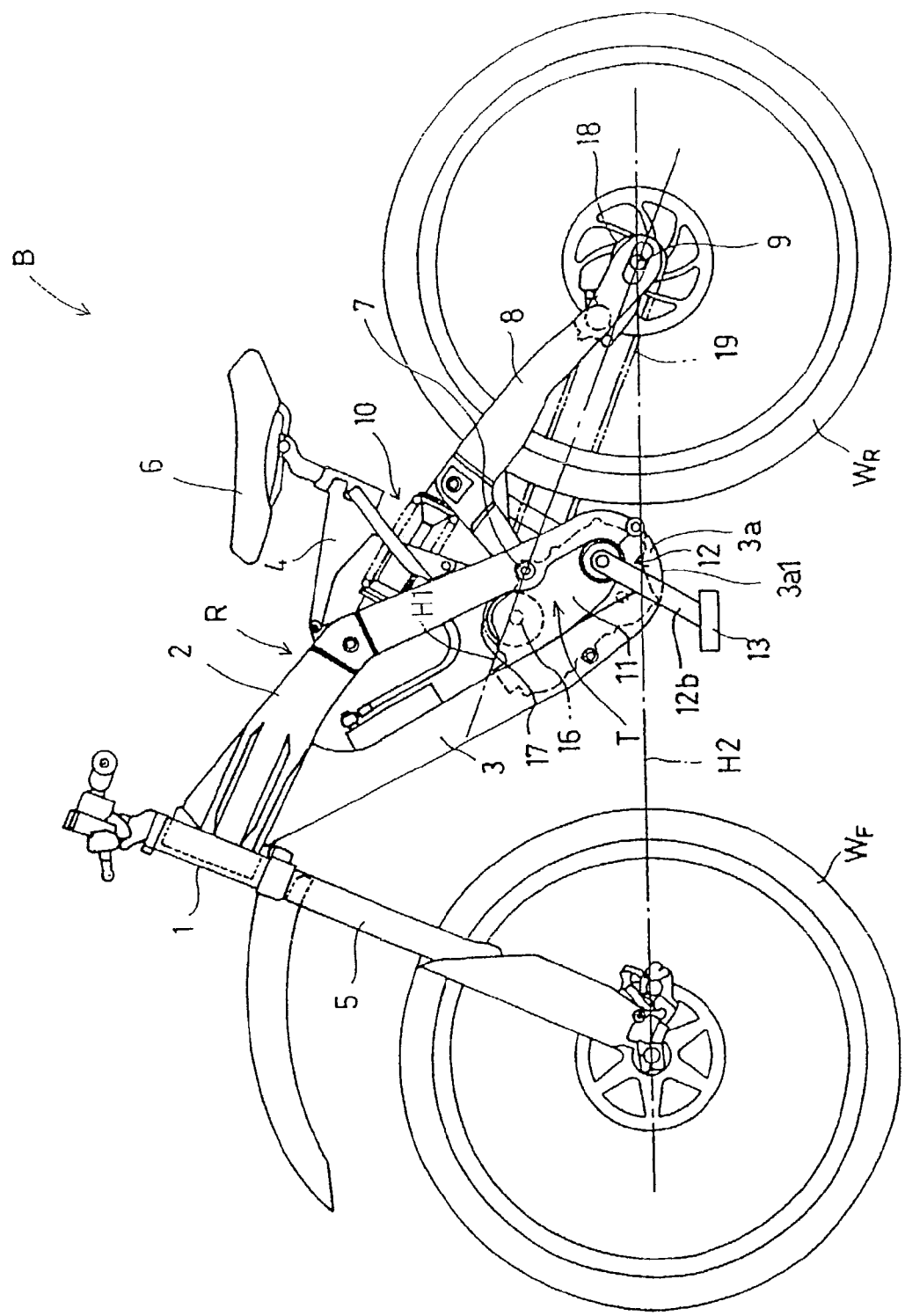
FIG. 1 is a left side-elevational view of a bicycle that is equipped with a continuously variable transmission according to the present invention, the view showing an embodiment of the present invention.

Referring to FIG. 1 which is a left side-elevational view of a bicycle that is equipped with a continuously variable transmission according to the present invention, a bicycle B is a downhill bicycle and is used in competitions in which it runs down an unpaved course with high-speed corners and jump sections, such as along a forest trail with ups and downs, to compete for time.

The bicycle B has a bicycle frame R comprising a head pipe 1 which steerably supports on its lower end a front fork 5 having a pair of left and right legs on which a front wheel $W_F$ is supported by an axle, a pair of left and right main frames 2 extending rearwardly and obliquely downwardly from the head pipe 1, a down tube 3 extending rearwardly and obliquely downwardly from front ends of the main frames 2 below the main frames 2, and a saddle frame 4 extending from a central portion of the main frames 2 and supporting a saddle 6.

A pair of left and right swing arms 8 have front ends angularly movably supported on a pivot shaft 7 mounted on rear portions of the main frames 2, and rear ends supporting an axle 9 on which a rear wheel $W_R$ is rotatably supported. The swing arms 8 is coupled to central portions of the main frames 2 by a suspension 10, and is vertically swingable about the pivot shaft 7. A continuously variable transmission T disposed between the front wheel $W_F$ and the rear wheel $W_R$ in the longitudinal direction of the bicycle is positioned between the rear portions of the main frames 2 and the rear portion of the down tube 3 and supported thereby.

The continuously variable transmission T is disposed either upwardly of a hypothetical plane H2 which contains the axis of rotation of the front wheel $W_F$ and the axis of rotation of the rear wheel $W_R$ or upwardly of a position below and near the hypothetical plane H2, and is also disposed upwardly of a lowermost end 3a1 of the down tube 3 which serves as the lowermost end of the bicycle frame R. The continuously variable transmission T has a lower end covered with a lower end portion 3a, including the lowermost end 3a1, of the down tube 3 which is positioned near the lower end of the continuously variable transmission T in the transverse direction (leftward and rightward direction) of the bicycle. The illustrated positions of the axes of rotation of the front wheel $W_F$ and the rear wheel $W_R$ are those assumed when no driver is riding on the bicycle.

Figure 2:
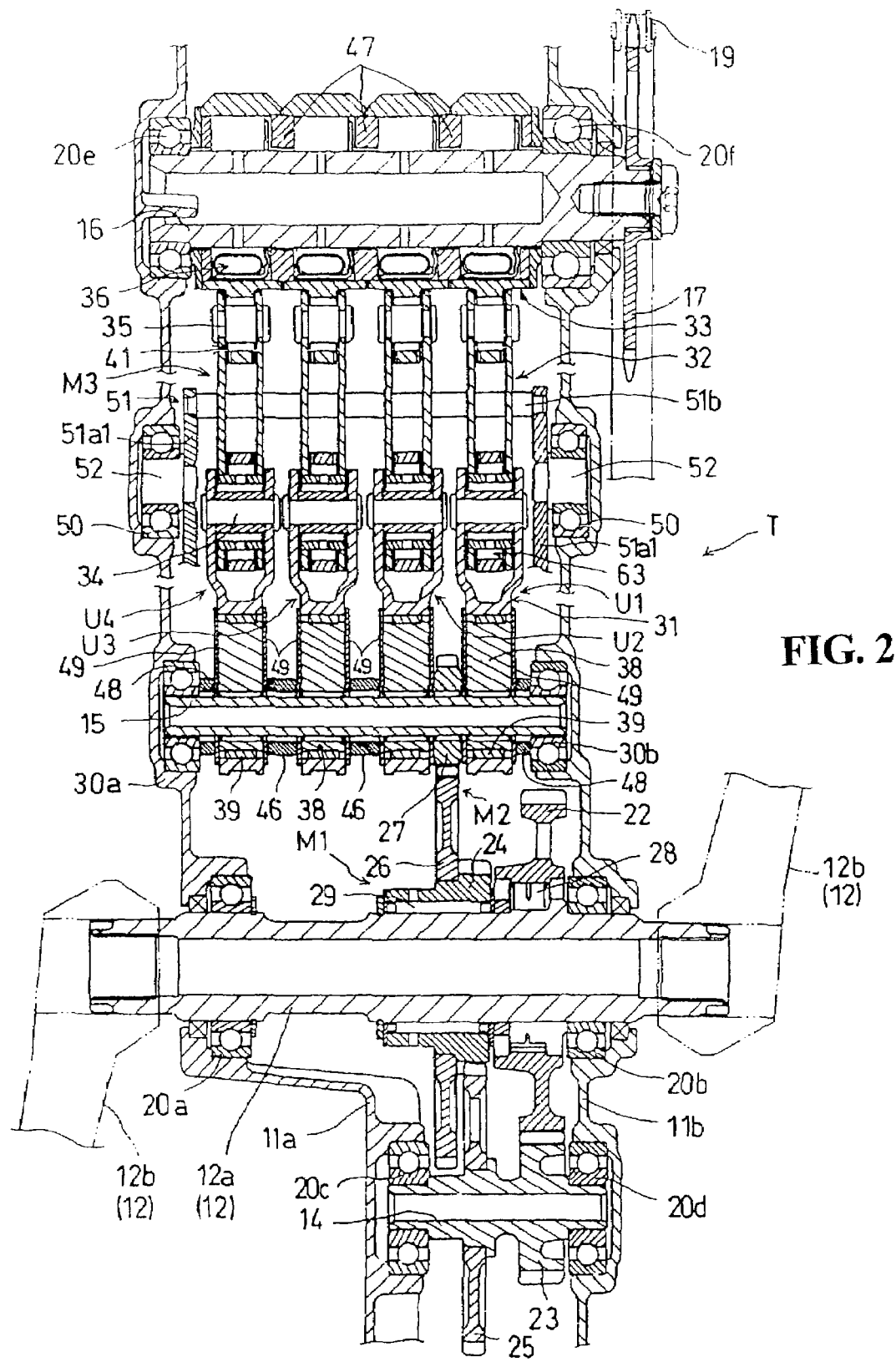
FIG. 2 is a developed cross-sectional view of link units of a transmission mechanism of the continuously variable transmission shown in FIG. 1, the view being a cross-sectional view taken along a plane passing through the axes of rotation of rotational shafts and the central axes of pivot shafts of the link units, as indicated by line IIA—IIA of FIG. 3, and partly a cross-sectional view taken along line IIB—IIB of FIG. 3.

Referring also to FIG. 2, a crankshaft 12 is disposed on a lower portion of the continuously variable transmission T and has a main shaft 12a housed in a case 11 of the continuously variable transmission T and a pair of crank arms 12b joined respectively to left and right ends of the main shaft 12a which project out of the case 11. The crankshaft 12 and pedals 12 rotatably supported on the respective crank arms 12b make up a pedal-operated crankshaft.

An output shaft 16 is disposed on an upper portion of the continuously variable transmission T and housed in the case 11. The output shaft 16 has a right end projecting out of the case 11, and a drive sprocket 17 serving as a drive rotor is coupled to the right end of the output shaft 16 which is disposed outside of the case 11. A chain 19 serving as an endless transmission belt is trained around the drive sprocket 17 and a driven sprocket 18 which is coupled to a rear hub 80 (see FIG. 10) of the rear wheel $W_R$ with a one-way clutch 82 interposed therebetween.

The output shaft 16 is disposed with respect to the bicycle frame R such that it is positioned near a hypothetical plane H1 which contains the central axes of the pivot shaft 7 and the axle 9. The drive sprocket 17 is disposed either upwardly of the hypothetical plane H2 or upwardly of a position below and near the hypothetical plane H2, and also disposed upwardly of the lowermost end 3a1 of the down tube 3. The expression "upwardly of a position below and near the hypothetical plane H2" refers to upwardly of the position of the lower end of the driven sprocket 18 in the vertical direction, for example.

Therefore, the torque of the crankshaft 12 which is rotated by the driver is transmitted through the output shaft 16 of the continuously variable transmission T and a transmitting mechanism which has the drive sprocket 17, the driven sprocket 18, and the chain 19 to the rear wheel $W_R$ which is a drive wheel coupled to the output shaft 16, thereby the rear wheel $W_R$ is driven rotatably.

The continuously variable transmission T will be described below with reference to FIGS. 2 and 3. The case 11 comprises a pair of left and right case members 11a, 11b which are fastened to each other by bolts. The main shaft 12a has portions near its opposite ends, an idle shaft 14 has opposite ends, and the output shaft 16 has portions near its left and right ends, rotatably supported on the case 11 by pairs of left and right bearings 20a, 20b; 20c, 20d; 20e, 20f held respectively by the case members 11a, 11b.

In the case 11, there are disposed a first drive gear 22 and a second driven gear 24 which are mounted on the main shaft 12a and arranged successively in the order named from the right bearing 20b which is one of the bearings supporting the main shaft 12a. The first drive gear 22 is operatively coupled to the main shaft 12a by a one-way clutch 28 which transmits only a torque in a normal direction A0 (a direction to move the bicycle B forward, a normal direction in which various shafts and sprockets rotate when the crankshaft 12 rotates in the normal direction will hereinafter be denoted by A0) in which the crankshaft 12 rotates to the first drive gear 22. The second driven gear 24 is rotatably supported on the main shaft 12a by a bearing 29.

The idle shaft 14 which lies parallel to the main shaft 12a in the case 11 supports thereon a first driven gear 23 held in mesh with the first drive gear 22 and a second drive gear 25 held in mesh with the second driven gear 24. A third drive gear 26 is integrally fixed to and disposed adjacent to the second driven gear 24. The third drive gear 26 is held in mesh with a third driven gear 27 which is splined to an input shaft 15 for rotation therewith, the input shaft 15 having opposite ends rotatably supported by the respective case members 11a, 11b by respective bearings 30a, 30b.

The drive gears 22, 25, 26 are larger in diameter than the driven gears 23, 24, 27 with which they mesh. The drive gears 22, 25, 26 and the driven gears 23, 24, 27 which mesh with each other jointly make up a speed increasing gear train having three speed increasing stages for increasing the rotational speed of the crankshaft 12 and transmitting the rotation at the increased rotational speed to the input shaft 15. Therefore, the input shaft 15 driven by the crankshaft 12 through a speed increasing mechanism M1 which comprises the speed increasing gear train disposed in the case 11 rotates at a rotational speed greater than the rotational speed of the crankshaft 12, i.e., at a rotational speed which is about 11 times the rotational speed of the crankshaft 12 in this embodiment.

Figure 4B:
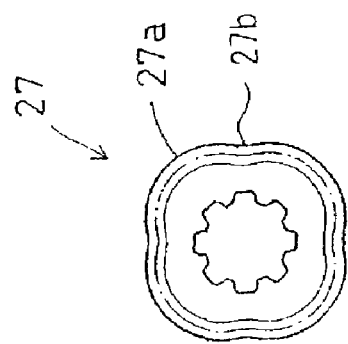
FIGS. 4(a) and (b) are front elevational views of gears of a variable-speed rotation transmitting mechanism of the continuously variable transmission shown in FIG. 1.
Figure 4A:
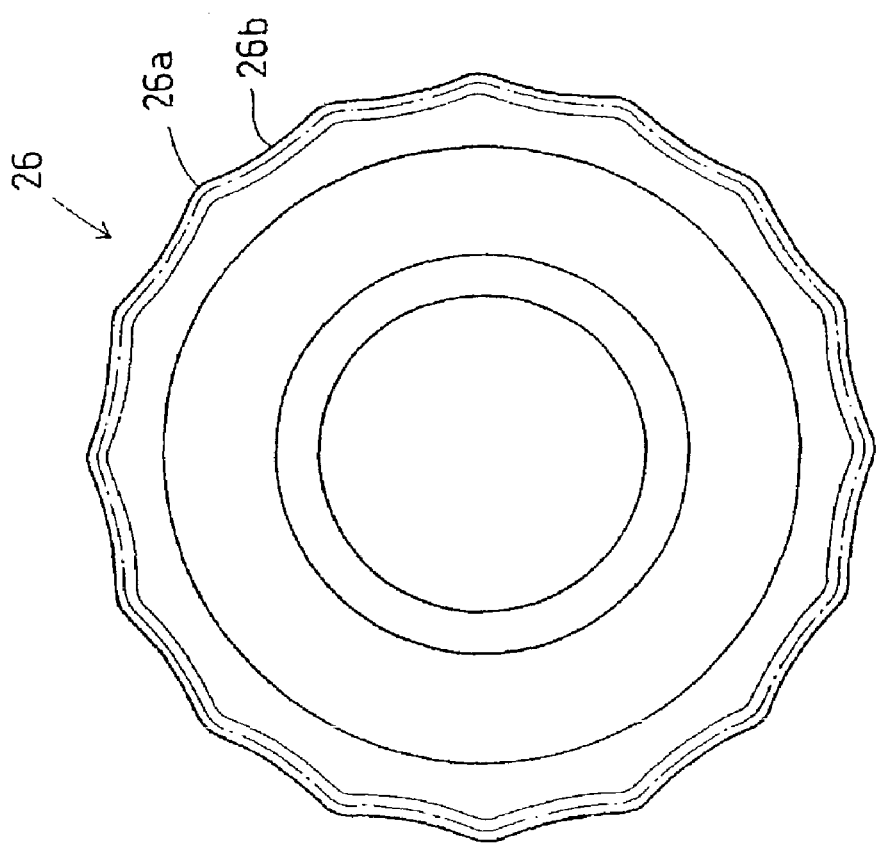

As shown in FIGS. 4(a) and (b), the third drive gear 26 and the third driven gear 27 comprise noncircular gears. The drive gear 26 and the third driven gear 27 mesh with each other at such a timing to reduce pulsations of the rotational speed of the output shaft 16, and jointly make up a variable-speed rotation transmitting mechanism M2 for rotating the input shaft 15 at a variable speed.

Specifically, the third driven gear 27 has as many peaks 27a and as many valleys 27b as the number of link units U1 through U4, to be described later on, of the continuously variable transmission T, i.e., has four peaks 27a and four valleys 27b in the present embodiment, and the third drive gear 26 has as many peaks 26a and as many valleys 26b as an integral multiple of the number of the peaks 27a and the number of the valleys 27b, i.e., has 16 peaks 26a and 16 valleys 26b in the present embodiment. The valleys 26b of the third drive gear 26 and the peaks 27a of the third driven gear 27 mesh with each other and the peaks 26a of the third drive gear 26 and the valleys 27b of the third driven gear 27 mesh with each other at respective times when the pulsating rotational speed of the output shaft 16 is maximum and minimum, respectively. The crankshaft 12 and the input shaft 15 are operatively coupled to each other by the variable-speed rotation transmitting mechanism M2 which is incorporated in the speed increasing mechanism M1 for reducing pulsations of the rotational speed of the output shaft 16.

Figure 3:
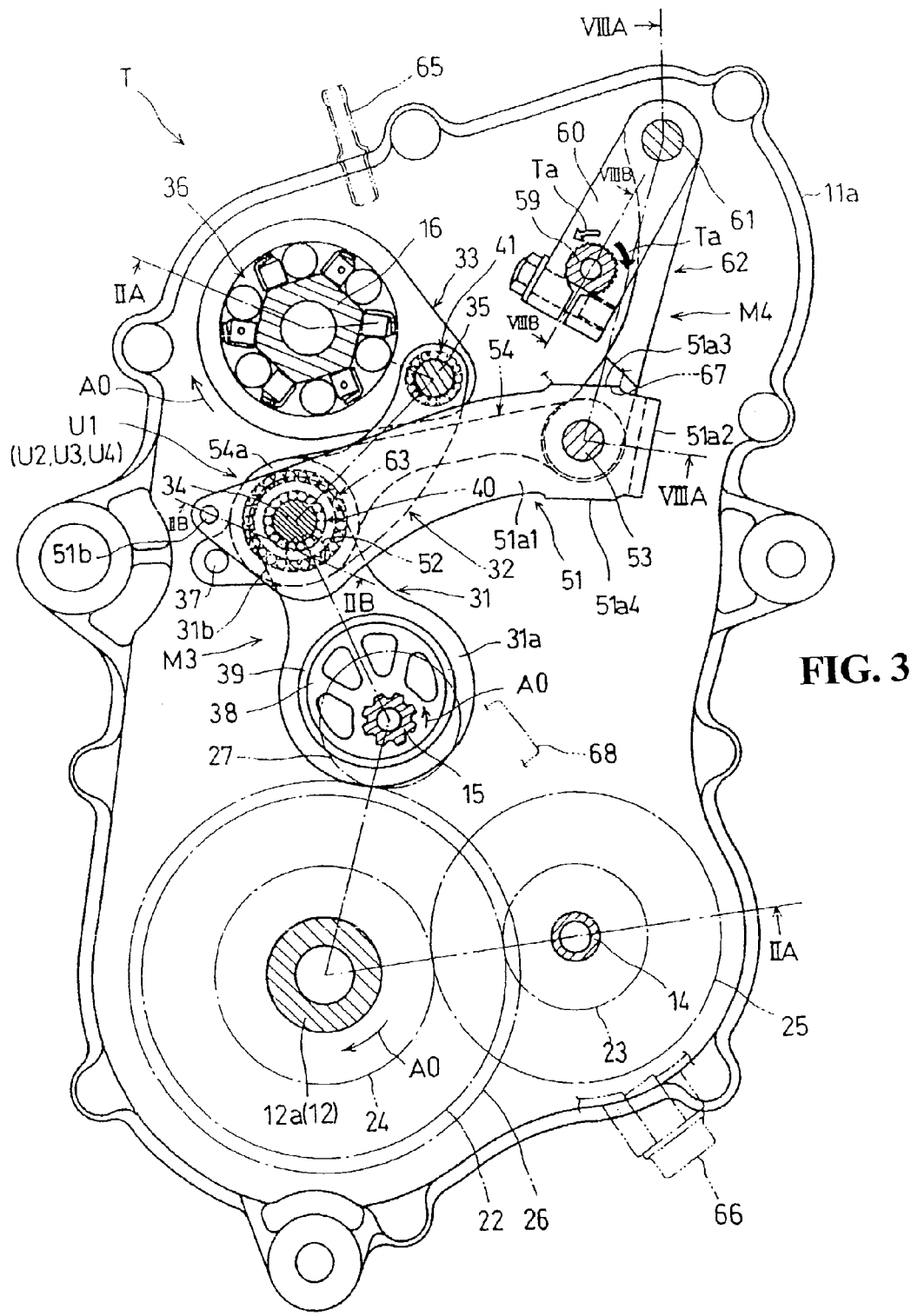
FIG. 3 is a right side elevational view of the continuously variable transmission shown in FIG. 1 which is at a minimum speed change ratio, with a right case member being removed and various shafts being shown in cross section.

As shown in FIGS. 2 and 3, the input shaft 15 is operatively coupled to the output shaft 16 by a transmission mechanism M3 having a plurality of, i.e., four in the present embodiment, link units U1 through U4 for converting rotary motion of the input shaft 15 into swinging motion, and a one-way clutch 36 coupled to the link units U1 through U4 for converting swinging motion of the link units U1 through U4 into rotary motion in the normal direction A0 of rotation of the output shaft 16.

The transmission mechanism M3 is controlled by a transmission control mechanism M4 which is operated when the driver operates a transmission lever (not shown) as a transmission control member. The transmission control mechanism M4 continuously varies a speed change ratio which is a ratio of the rotational speed of the output shaft 16 to the rotational speed of the crankshaft 12.

Figure 5:
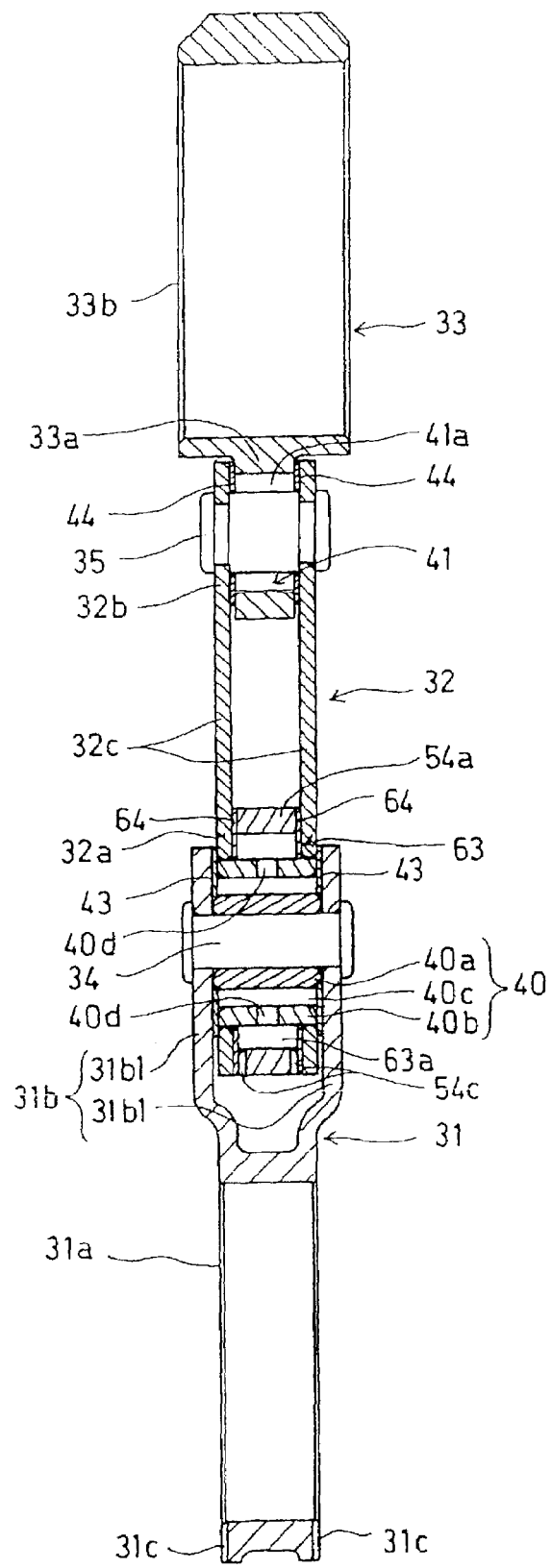
FIG. 5 is a cross-sectional view taken along line V—V of FIG. 6.
Figure 6:
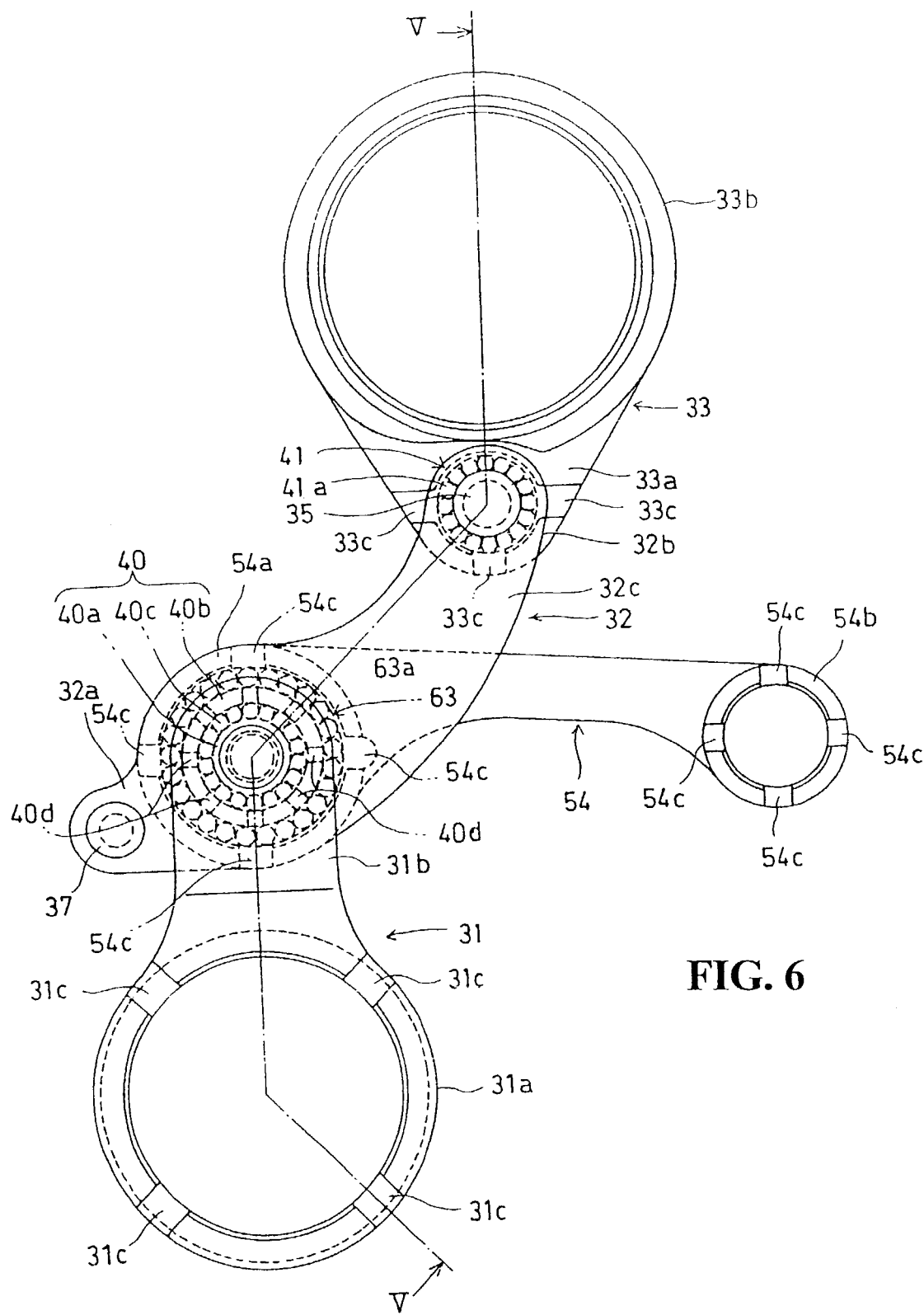
FIG. 6 is a right side elevational view of a link unit of the transmission mechanism of the continuously variable transmission shown in FIG. 1.
Figure 7A:
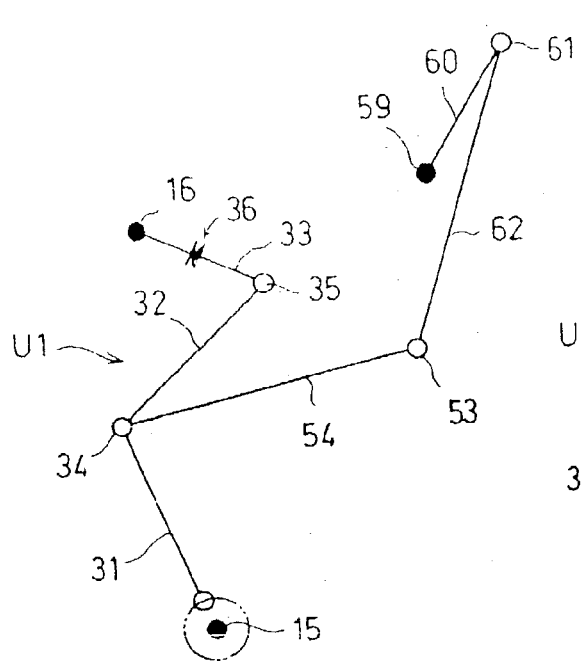
FIGS. 7(a), (b), (c), and (d) are schematic views illustrative of forms in which the four link units of the transmission mechanism of the continuously variable transmission shown in FIG. 1 are pivotally mounted on an input shaft.
Figure 7B:
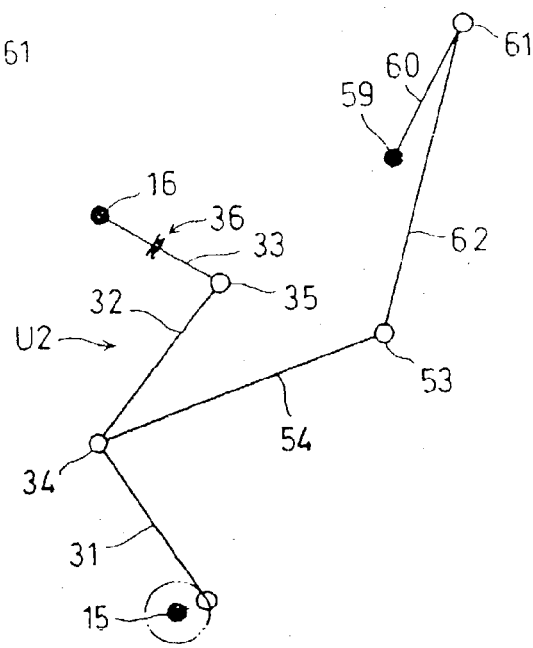
Figure 7C:
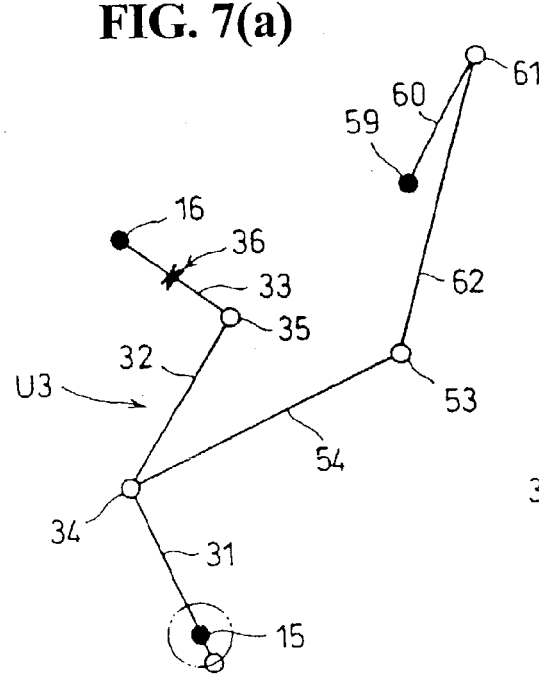
Figure 7D:
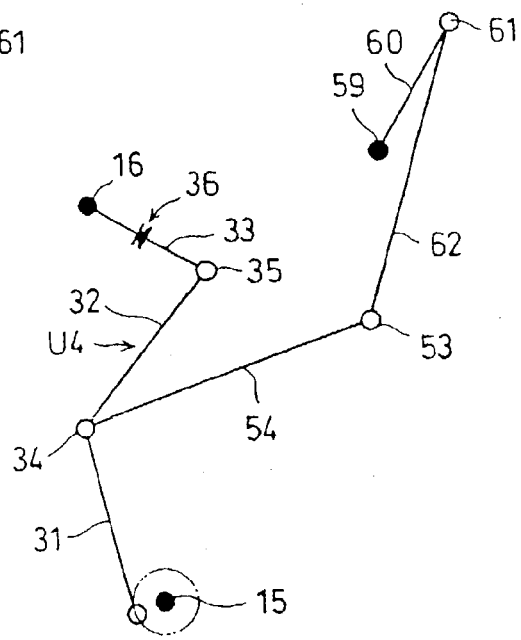

Referring also to FIGS. 5 and 6, each of the link units U1 through U4 comprises a plurality of, three in the present embodiment, of transmission links. Specifically, each of the link units U1 through U4 comprises a drive link 31 pivotally mounted eccentrically on the input shaft 15, an output link 33 operatively coupled to the output shaft 16 by a one-way clutch 36, and a transmitting link 32 angularly movably supported on, i.e., pivotally coupled to the drive link 31 by a first pivot shaft 34 as a first pivot support and angularly movably supported on, i.e., pivotally coupled to the output link 33 by a second pivot shaft 35 as a second pivot support.

The drive link 31 comprises an annular first joint 31a and a bifurcated second joint 31b joined to the first joint 31a and having a pair of plates 31b1. The transmitting link 32 comprises a pair of plates 32c coupled to each other at ends 32a thereof by a rivet 37 with a gap provided therebetween. The output link 33 comprises a first joint 33a sandwiched between the plates 32c of the transmitting link 32 and an annular second joint 33b joined to the first joint 33a.

The first joint 31a is pivotally supported by a slide bearing 39 on an outer circumferential surface of an eccentric ring 38 which is splined to the input shaft 15 for rotation therewith. Therefore, the drive link 31 is pivotally mounted eccentrically on the input shaft 15. The central axis of the eccentric ring 38, i.e., the axis around which the drive link 31 is angularly movable, is offset from the axis of rotation of the input shaft 15 by a predetermined distance.

As shown in FIGS. 5 and 6, the first joint 31a has a plurality of, e.g., four, circumferentially equally spaced oil grooves 31c defined radially therein. Lubricating oil in the case 11 is supplied through the oil grooves 31c to the slide bearing 39.

The transmitting link 32 is angularly movably supported on the first pivot shaft 34 which is fixedly supported on the plates 31b1 of the second joint 31b, by a needle bearing 40 disposed between the plates 31b1. The needle bearing 40 comprises an inner race 40a fitted over the first pivot shaft 34 and fixedly sandwiched between the plates 31b1, an outer race 40b disposed radially outwardly of the inner race 40a and fitted in holes defined in the ends 32a of the plates 32c, and a plurality of needles 40c disposed between the inner race 40a and the outer race 40b.

The needles 40c are prevented from moving axially by the plates 31b1 of the drive link 31 with a pair of thrust washers 43 interposed therebetween which are disposed on opposite ends of the needle bearing 40. Since the needles 40c are arranged with no circumferential gaps therebetween, no retainer is required to hold the needles 40c. Therefore, the needle bearing 40 comprises a retainerless needle bearing which is free of retainers. The outer race 40b has a plurality of circumferentially spaced, i.e., eight circumferentially equally spaced in the present embodiment, oil holes 40d defined therein.

The first joint 33a of the output link 33 is angularly movably supported by a needle bearing 41 on the second pivot shaft 35 which is fixedly supported on other ends 32b of the plates 32c, so that the transmitting link 32 is supported on the output link 33 for relative angular movement with respect thereto. The needle bearing 41 comprises a plurality of needles 41a disposed on an outer circumferential surface of the second pivot shaft 35 and surrounded in position by the first joint 33a of the output link 33.

The needles 41a are prevented from moving axially by the plates 32c of the transmitting link 32 with a pair of thrust washers 44 interposed therebetween which are disposed on opposite ends of the needles 41a. The needles 41a are arranged with no circumferential gaps therebetween. Therefore, the needle bearing 41 comprises a retainerless needle bearing, as with the needle bearing 40. As shown in FIG. 6, the first joint 33a has a plurality of, e.g., three, circumferentially equally spaced oil holes 33c defined in sides thereof. Lubricating oil in the case 11 is supplied through the oil grooves 33c to the needle bearing 41.

The second joint 33b of the output link 33 is operatively coupled to the output shaft 16 by the one-way clutch 36 which transmits only a torque to rotate the output shaft 16 in the normal direction A0 from the output link 33 which swings about the axis of rotation of the output shaft 16. The one-way clutch 36 transmits the torque from the output links 33 to the output shaft 16 only when the output links 33 swing at an angular velocity ω (see FIG. 13) in the normal direction A0 of rotation of the output shaft 16, i.e., only when the output links 33 swing at an angular velocity greater than the rotational speed in the normal direction A0 of rotation of the output shaft 16. The one-way clutch 36 has an outer member constructed as the second joint 33b and an inner member as the output shaft 16, and hence is operatively coupled to the output link 33 and the output shaft 16.

As shown in FIG. 2, the four link units U1 through U4 are arranged side by side at equally spaced intervals along the axes of rotation of the input shaft 15 and the output shaft 16 which lie parallel to each other, i.e., in the transverse direction of the bicycle. Specifically, two annular collars 46, which serve as spacers for keeping the adjacent link units U2, U3; U3, U4 spaced from each other along the axes of rotation of the input and output shafts 15, 16, are fitted over the input shaft 15 laterally of the first joints 31a of the drive links 31. The collars 46 are disposed between the adjacent link units U2, U3 and the adjacent link units U3, U4. To keep the adjacent link units U1, U2 spaced from each other near the right end of the input shaft 15, the third driven gear 27 is disposed between these link units U1, U2.

Specifically, in the continuously variable transmission T, in order to minimize the length of the idle shaft 14 on which the first driven gear 23 and the second drive gear 25 of the speed increasing mechanism M1 are mounted, the idle shaft 14 being disposed on one side, i.e., the right side, of the transverse direction (leftward and rightward direction) of the bicycle, which is also the direction of the axis of rotation of the crankshaft 12.

Also, to reduce the weight and size of the second driven gear 24 and the third drive gear 26 which are mounted on the main shaft 12a, the third driven gear 27 held in mesh with the third drive gear 26 is coupled to the input shaft 15 between the link unit U1 on the right end, which is a particular link unit closest to the bearing 30*b* by which the input shaft 15 is rotatably supported, and the link unit U2 adjacent to the link unit U1.

As shown in FIGS. 2 and 3, the drive link 31 of the link unit U1 on the right end is disposed between the first drive gear 22 and the third drive gear 26 in the transverse direction of the bicycle. Because of its reciprocating motion, the drive link 31 is disposed in a position overlapping the first drive gear 22 and the third drive gear 26 in the radial direction of the main shaft 12*a*.

Three annular collars 47 serving as spacers for keeping the adjacent link units U1, U2; U2, U3; U3, U4 are fitted over the output shaft 16 laterally of the second joint 33*b* of the output link 33.

As shown in FIGS. 7(*a*)–(*d*), the drive links 31 of the four link units U1 through U4 are pivotally mounted on the input shaft 15 in different phases. In the present embodiment, the drive links 31 are pivotally mounted on the input shaft 15 such that the axes of angular movement of all the drive links 31 are spaced at equal angles of 90° circumferentially around the input shaft 15. FIGS. 7(*a*)–(*d*) show a third pivot shaft 53, a support shaft 59, a fourth pivot shaft 61, and a second intermediate link 62 at the time transmission control links 54, to be described later on, are in a minimum speed change ratio position.

As shown in FIG. 2, in each of the link units U1 through U4, the opposite ends of the eccentric rings 38 and the slide bearings 39 in their axial direction are covered with a pair of disk-shaped covering plates 49 which are splined to the input shaft 15. The covering plates 49 are prevented from moving on the input shaft 15 in the axial direction thereof by the collars 46, 48 and the third driven gear 27.

Figure 8:
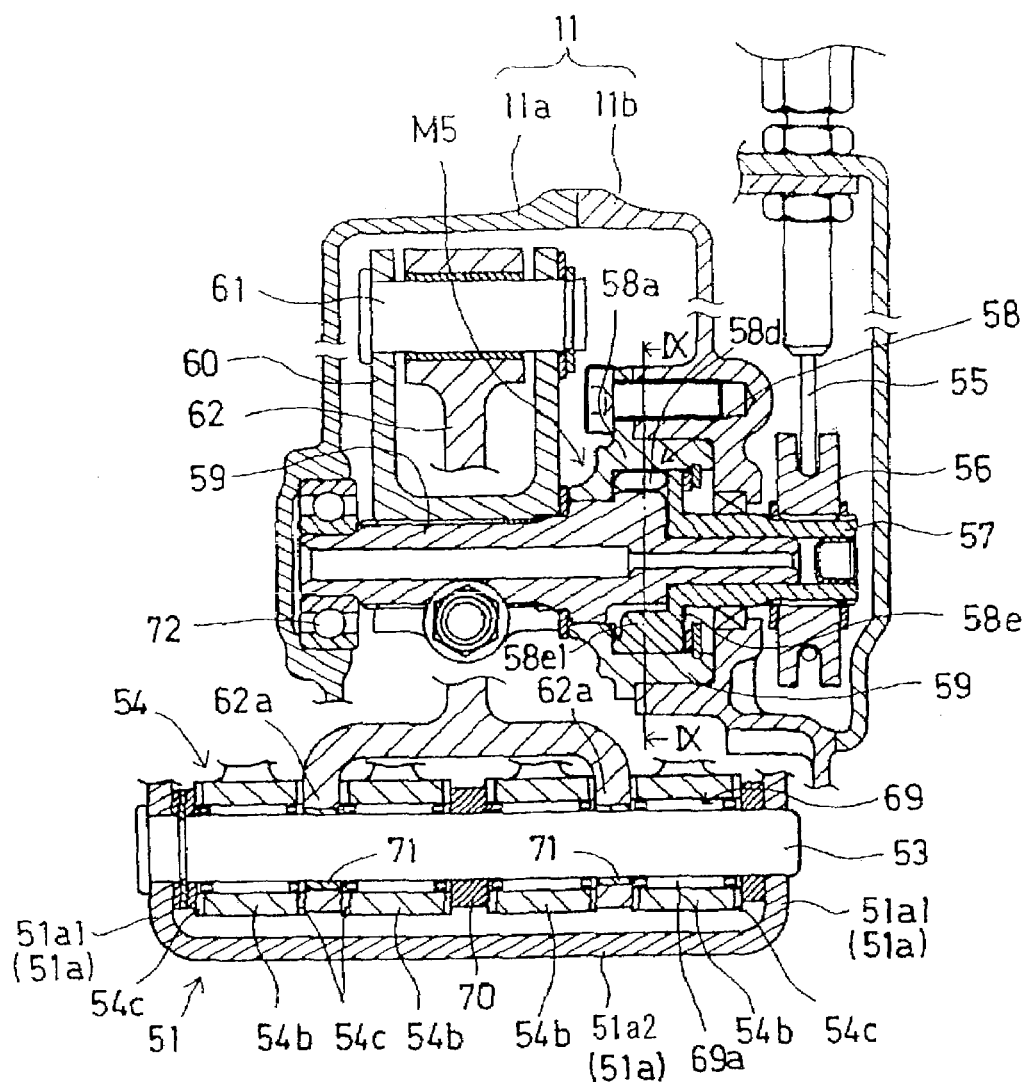
FIG. 8 is a cross-sectional view taken along lines VIIIA—VIIIA and VIIIB—VIIIB of FIG. 3.

As shown in FIGS. 2, 3, and 8, the transmission control mechanism M4 comprises, in a position near the first pivot shafts 34 (central shafts 52 to be described later on are shown by two-dot-and-dash lines in FIG. 3), a support member 51 angularly movably supported on the case members 11*a*, 11*b* by bearings 50, transmission control links 54 pivotally mounted on the respective link units U1 through U4 by the first pivot shafts 34 and pivotally mounted on the support member 51 by a third pivot shaft 53 serving as a third pivot support, and a control shaft 57 angularly movable in unison with a drum 56 engaged by an end of a control wire 55 which is connected to the transmission lever (not shown).

The transmission control mechanism M4 also includes a support shaft 59 operatively coupled to the control shaft 57 by protrusions 58*e*3 to be described later on, a first intermediate link 60 angularly movable in unison with the support shaft 59, and a second intermediate link 62 pivotally mounted on the support member 51 by the third pivot shaft 53 and pivotally mounted on the first intermediate link 60 by a fourth pivot shaft 61 serving as a fourth pivot support. The first intermediate link 60 and the second intermediate link 62 jointly make up a link mechanism.

As shown in FIGS. 2, 3, 5, and 6, each of the four transmission control links 54 which make up a transmission control link train has an annular distal end 54*a* as one end thereof which is sandwiched between the plates 32*c* of the transmitting link 32 around the needle bearing 40 and angularly movably supported on the needle bearing 40 by a needle bearing 63. Thus, the transmission control links 54 are pivotally mounted on the drive links 31 and the transmitting links 32 by the first pivot shafts 34 of the respective link units U1 through U4.

The needle bearing 63 comprises a plurality of needles 63*a* disposed on the outer circumferential surface of the outer race 40*b* and surrounded in position by the annular distal end 54*a*. Between the plates 31*b*1 of the drive link 31 in the transverse direction of the bicycle, therefore, there are disposed the two needle bearings 40, 63 which are stacked radially on the first pivot shaft 34 and disposed coaxially therewith. The needles 63*a* are prevented from moving axially by the plates 32*c* of the transmitting link 32 with a pair of thrust washers 64 interposed therebetween which are disposed on opposite ends of the needles 63*a*. The needles 63*a* are arranged with no circumferential gaps therebetween. Therefore, as with the needle bearing 40, the needling bearing 63 comprises a retainerless needle bearing.

As shown in FIGS. 5 and 6, the distal end 54*a* has a plurality of circumferentially spaced, i.e., four circumferentially equally spaced in the present embodiment, oil grooves 54*c* defined in opposite sides thereof. Lubricating oil filled in the case 11 is supplied through the oil grooves 54*c* to the needle bearing 63 and then through the oil holes 40*d* in the outer race 40*b* to the needle bearing 40. As shown in FIG. 3, the right case member 11*b* has a breather pipe 65 and a drain bolt 66 for draining lubricating oil from the case 11.

As shown in FIGS. 2, 3, and 8, the support member 51 comprises a U-shaped support link 51*a* bent from a plate, and a coupling shaft 51*b* serving as a spacer fitted in opposite ends of the support link 51*a* for keeping the opposite ends of the support link 51*a* spaced in the transverse direction of the bicycle. The support link 51*a* comprises a pair of parallel sides 51*a*1 facing each other in the transverse direction of the bicycle and a joint 51*a*2 joined to the sides 51*a*1. Central shafts 52 are supported on the case members 11*a*, 11*b* by the bearings 50 and fixed to the respective sides 51*a*1, so that the support member 51 is angularly movably supported in the case 11, together with the central shafts 52 disposed in sandwiching relation to all the link units U1 through U4 in the transverse direction of the bicycle.

Therefore, the support member 51 is swingable about the central shafts 52. One of the sides, i.e., the right side 51*a*1, of the support link 51*a* has a pair of abutment surfaces 51*a*3, 51*a*4 formed thereon for abutment against respective first and second stoppers 67, 68 (see FIG. 3) projecting on the inner surface of the right case member 11*b*. The first and second stoppers 67, 68 define minimum and maximum speed change ratio positions, respectively, of the transmission control links 54.

As shown in FIG. 8, the third pivot shaft 53 is fixed to and integrally supported by the sides 51*a*1 of the support member 51, the third pivot shaft 53 extending between the sides 51*a*1 near the joint 51*a*2. The four transmission control links 54 whose distal ends 54*a* are pivotally mounted on the four link units U1 through U4, respectively, have annular proximal ends 54*b* as other ends thereof which are pivotally mounted on the third pivot shaft 53 by needle bearings 69 each having a plurality of needles 69*a*, and hence pivotally mounted on the support member 51.

Each of the proximal ends 54*b* has a plurality of circumferentially spaced, i.e., four circumferentially equally spaced in the present embodiment, oil grooves 54*c* defined in opposite sides thereof. Lubricating oil filled in the case 11 is supplied through the oil grooves 54*c* to the needle bearing 69.

The transmission control links 54 are arranged at equally spaced intervals on the third pivot shaft 53 in the axial direction (the transverse direction of the bicycle), using a collar 70 and the second intermediate link 62. Specifically, the collar 70 serving as a spacer is disposed between the two central adjacent transmission control links 54 (these transmission control links 54 are pivotally mounted on the link units U2, U3). The second intermediate link 62 has a bifurcated portion having two distal ends 62a pivotally mounted on the third pivot shaft 53 by respective slide bearings 71 between the transmission control links 54 at the opposite ends (these transmission control links 54 are pivotally mounted on the link units U1, U4) and the transmission control links 54 adjacent thereto. The distal ends 62a that are disposed between the sides 51a1 of the support member 51 are thus used as a spacer which has the same function as the collar 70.

Figure 9:
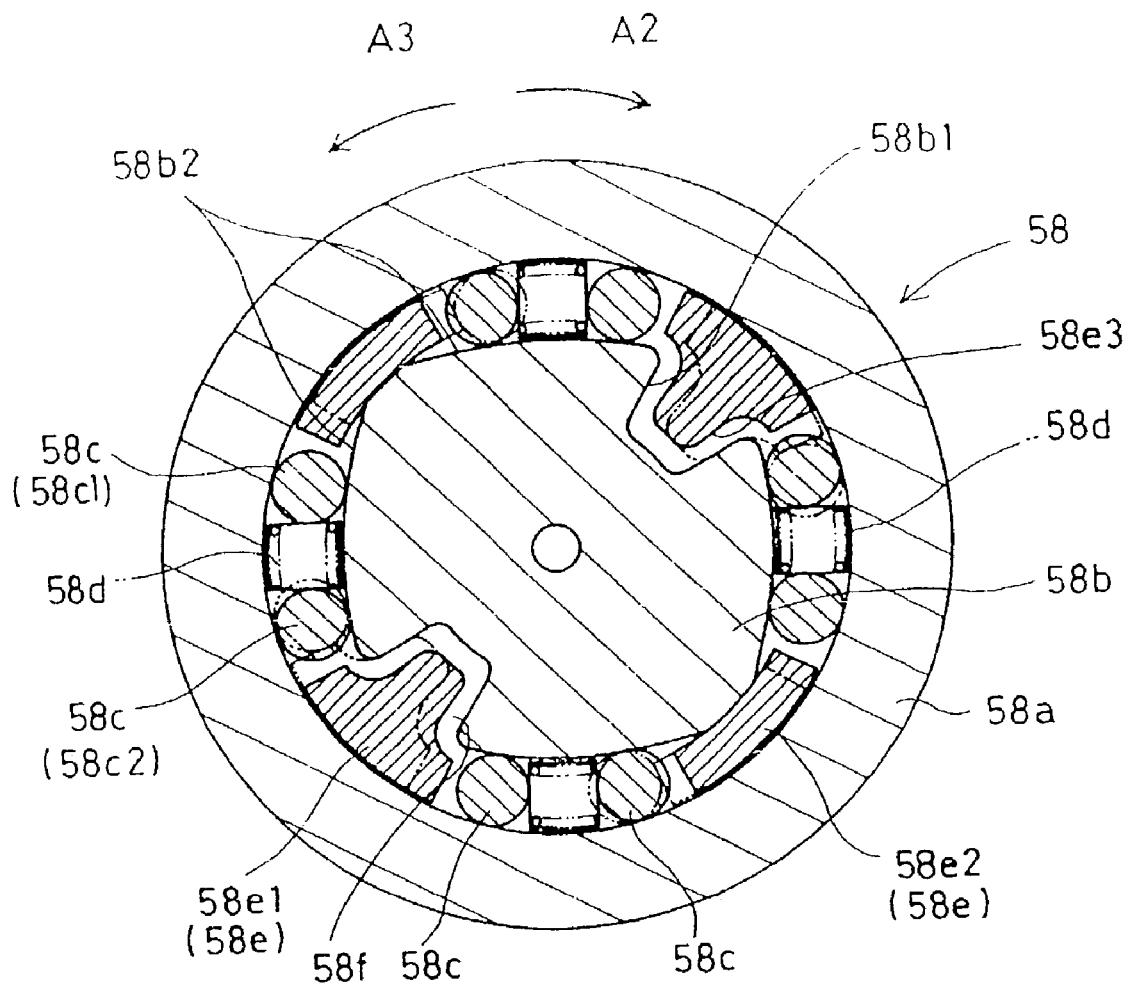
FIG. 9 is a cross-sectional view taken along line IX—IX of FIG. 8.

As shown in FIGS. 8 and 9, the support shaft 59 is angularly movably supported on the left case member 11a by a bearing 72. The support shaft 59 is held on the right case member 11b by a two-way clutch 58 which functions as two one-way clutches for preventing a component (see FIGS. 14(a) and (b)) of a drive force acting from the input shaft 15 on the drive links 31 of the link units U1 through U4, from turning the drum 56 through the first pivot shaft 34, the transmission control links 54, the support member 51, the third pivot shaft 53, the second intermediate link 62, the first intermediate link 60, and the support shaft 59.

The two-way clutch 58 comprises an outer race 58a fixed to the right case member 11b, an inner race 58b comprising a member rotatable in unison with the support shaft 59, i.e., a portion of the support shaft 59 in the present embodiment, an even number of, eight in the present embodiment, rollers 58c disposed in an accommodating space defined radially between the races 58a, 58b, clutch springs 58d comprising compression springs disposed in the accommodating space circumferentially between pairs of the rollers 58c, and a retainer 58e disposed circumferentially between pairs of the rollers 58c remote from the clutch springs 58d.

The retainer 58e is integrally formed with the control shaft 57, and is brought into abutment against the rollers 58c when the control shaft 57 is angularly moved in a direction A2 for making a shift-up (hereinafter referred to as "up direction A2") and also when the control shaft 57 is angularly moved in a direction A3 for making a shift-down (hereinafter referred to as "down direction A3").

Specifically, the retainer 58e has a pair of first holders 58e1 positioned in diametrically opposite relation to each other across the control shaft 57 and having respective engaging members comprising protrusions 58e3 which are engageable with engaging members comprising recesses 58b1 defined in the inner race 58b, and second holders 58e2 positioned circumferentially between the first holders 58e1.

Gaps 58f are defined between the recesses 58b1 and the protrusions 58e3 for allowing the retainer 58e and the inner race 58b to angularly move relatively to each other. Due to such relative motion until the protrusions 58e3 engage wall surfaces of the recesses 58b1, the first and second holders 58e1, 58e2 press the rollers 58c against the resilient forces of the clutch springs 58d, preventing the rollers 58c from being wedged (locked) between the outer race 58a and the inner race 58b, i.e., bringing the rollers 58c into an unlocked state.

The inner race 58b has on its outer circumferential surface a cam surface 58b2 which makes the accommodating space different in radial width in the circumferential direction, for causing rollers 58c1 in the up direction A2, among the pairs of the rollers 58c which confront each other across the clutch springs 58d, thus allowing the support shaft 59 to angularly move in the up direction A2 and prevent the support shaft 59 from angularly moving in the down direction A3, and also for causing rollers 58c2 in the down direction A3, among the pairs of the rollers 58c which confront each other across the clutch springs 58d, to allow the support shaft 59 to angularly move in the down direction A3 and prevent the support shaft 59 from angularly moving in the up direction A2.

When a control force applied to the transmission lever causes the control wire 55 to angularly move the drum 56 in the up direction A2, the first and second holders 58e1, 58e2 angularly move relatively to each other in the up direction A2, engaging the rollers 58c2 to bring the rollers 58c2 into the unlocked state, as indicated by the two-dot-and-dash lines in FIG. 9. Thereafter, the protrusions 58e3 engage the wall surfaces of the recesses 58b1, causing the first holders 58e1 to engage the inner race 58b and angularly move in the up direction A2 in unison with the support shaft 59.

Conversely, when a control force applied to the transmission lever causes the control wire 55 to angularly move the drum 56 in the down direction A3, the first and second holders 58e1, 58e2 angularly move relatively to each other in the down direction A3, engaging the rollers 58c1 to bring the rollers 58c1 into the unlocked state. Thereafter, the protrusions 58e3 engage the wall surfaces of the recesses 58b1, causing the first holders 58e1 to engage the inner race 58b and angularly move in the down direction A3 in unison with the support shaft 59.

Figure 12B:
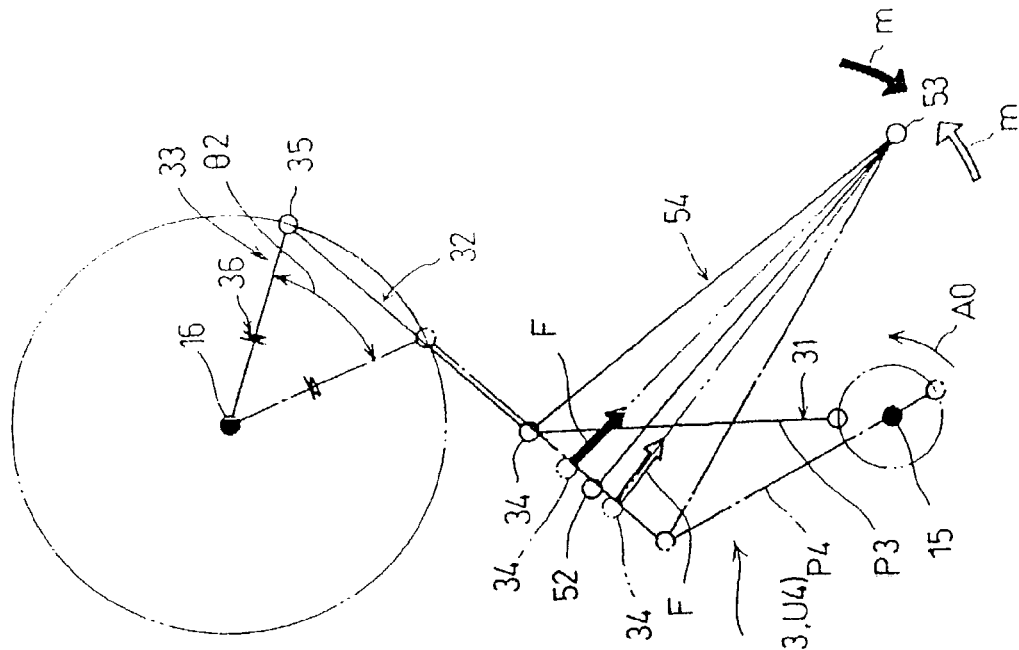
FIGS. 12(a) and (b) are schematic views illustrative of swinging angular ranges of output links of the continuously variable transmission shown in FIG. 1, FIG. 12(a) being illustrative of the swinging angular range at a minimum speed change ratio, and FIG. 12(b) being illustrative of the swinging angular range at a maximum speed change ratio.
Figure 12A:
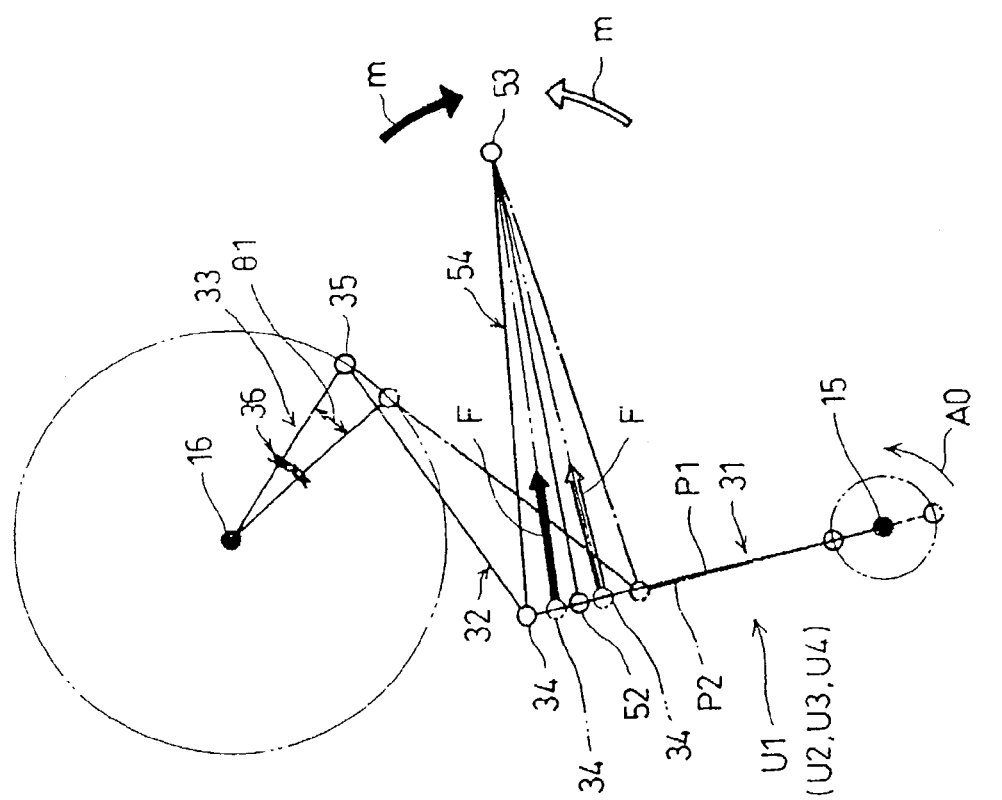

Referring to FIGS. 12(a) and (b), while the crankshaft 12 is in rotation, the link units U1 through U4 transmit a torque through the output links 33 and the one-way clutches 36 to the output shaft 16, thus rotating the output shaft 16. The drive force applied from the input shaft 15 to reciprocally move the drive links 31 of the link units U1 through U4 has a component acting from the first pivot shafts 34 through the transmitting links 32 on the output links 33 and another component F acting from the first pivot shafts 34 on the transmission control links 54. As viewed from the axis of rotation of the input shaft 15, the component F produces a moment about the central shafts 52 which are positioned substantially centrally on the path of movement of the first pivot shafts 34 which are reciprocally moved by the rotation of the input shaft 15. (The central shafts 52, the first through third pivot shafts 34, 35, 53, and the input shaft 15 are disposed parallel to each other.)

The moment is reversed across the central shafts 52 depending on the position of the first pivot shafts 34, i.e., the moment becomes either a moment m tending to swing the third pivot shaft 53 clockwise or a moment m tending to swing the third pivot shaft 53 counterclockwise. The moment generates a torque Ta (see FIG. 3) tending to cause the second intermediate link 62 and the first intermediate link 60 to angularly move the support shaft 59 in the up direction A2 or the down direction A3. As shown in FIG. 14, the torque Ta has a magnitude and a direction corresponding to a change in the drive force acting on the drive links 31 of the link units U1 through U4 which are rotating the output shaft 16.

Figure 14A:
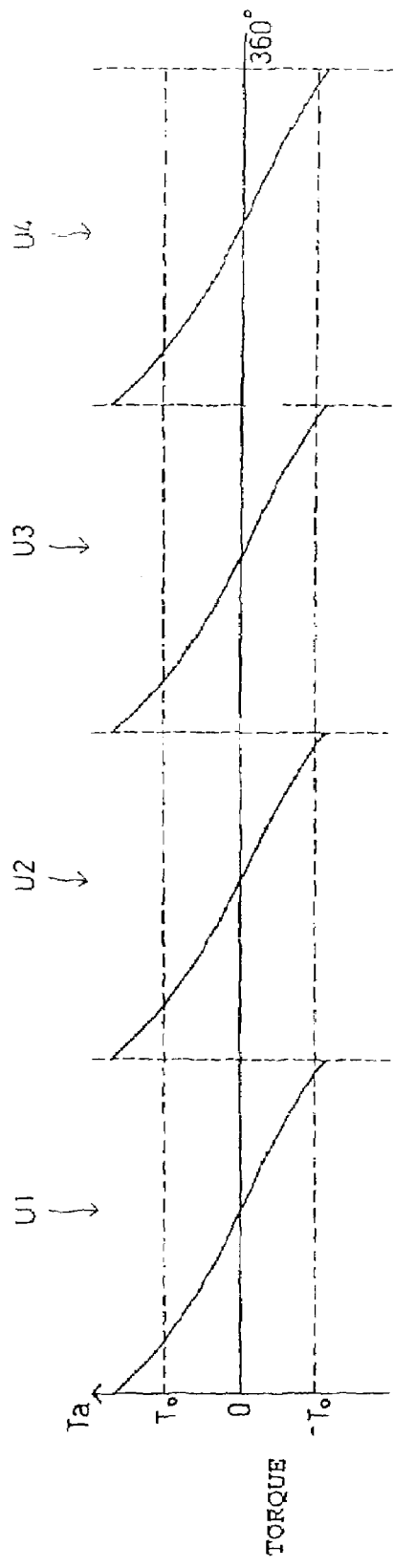
FIGS. 14(a) and (b) are diagrams illustrative of torques generated based on a component of a drive force acting on the continuously variable transmission shown in FIG. 1 per revolution of the input shaft, FIG. 14(a) being illustrative of the torques at a minimum speed change ratio, and FIG. 14(b) being illustrative of the torques at a maximum speed change ratio.

In FIGS. 14(a) and (b), the reference characters U1 through U4 represent link units which are rotating the output shaft 16, and the reference characters To represent values indicative of criteria for the magnitude of the torque Ta. If no control force is applied through the control wire 55 to the retainer 58e at this time, then even when the torque Ta acts to turn the support shaft 59 in either the up direction A2 or the down direction A3, the rollers 58c are locked, preventing the support shaft 59 from turning. When a control force for making a shift-up (a shift-down, a description corresponding to a shift-down will be inserted in parentheses) is acting on the retainer 58e, if the torque Ta acts to turn the support shaft 59 in the up direction A2 (the down direction A3), then the torque Ta serves as an assistive force, reducing the control force. If the torque Ta acts to turn the support shaft 59 in the down direction A3 (the up direction A2), then the rollers 58c are locked, preventing the support shaft 59 from turning in the down direction A3 (the up direction A2).

Therefore, the control shaft 57, the two-way clutch 58, the support shaft 59, the first intermediate link 60, the fourth pivot shaft 61, and the second intermediate link 62 jointly make up a transmitting mechanism M5 for transmitting the control force from the control lever to the third pivot shaft 53.

Figure 10:
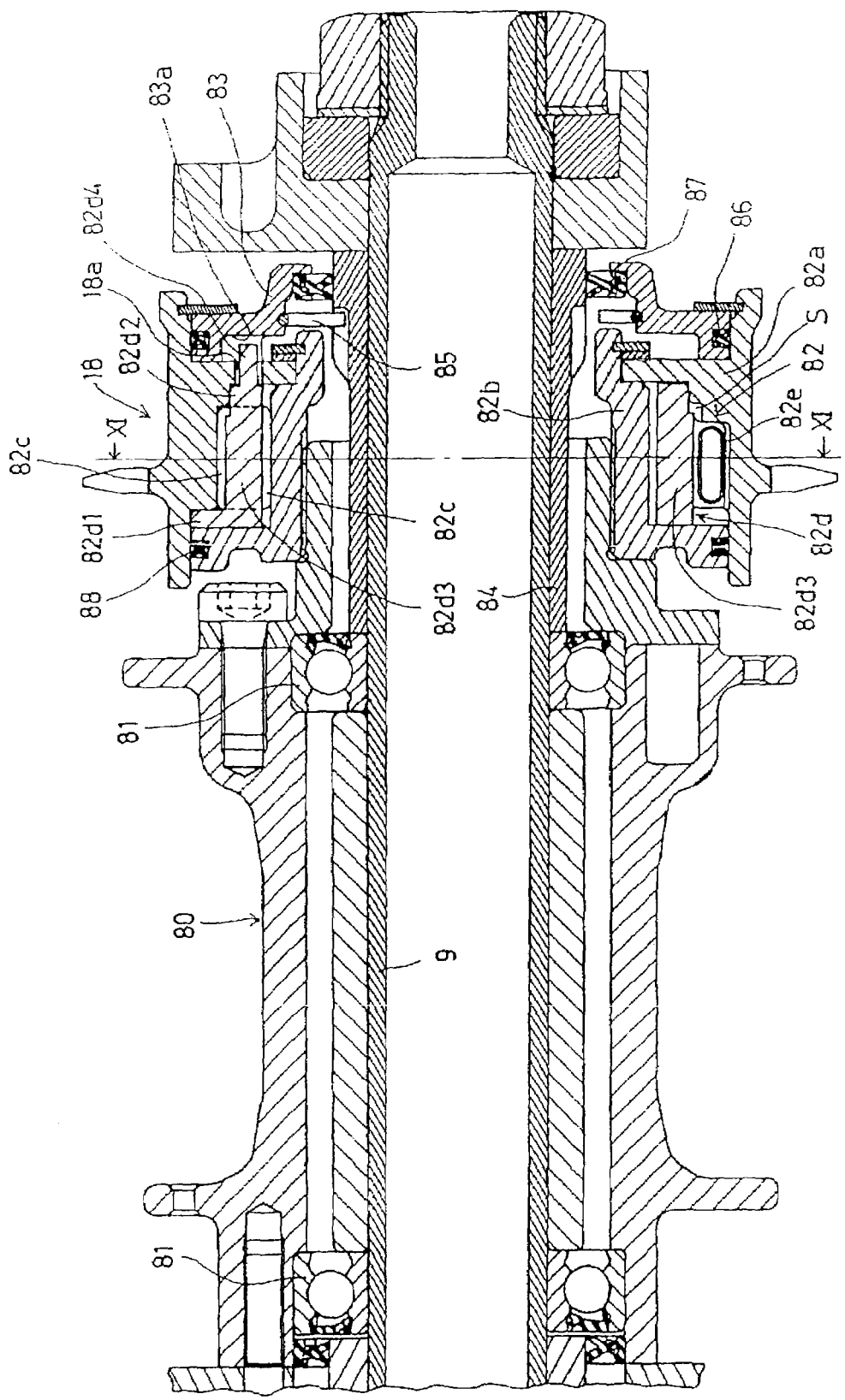
FIG. 10 is a cross-sectional view of a rear hub and a driven sprocket of the bicycle, taken along line X—X of FIG. 11.

The rear hub 80 and the driven sprocket 18 will be described below with reference to FIGS. 10 and 11. The driven sprocket 18 is mounted on a right end of the rear hub 80 which is rotatably supported on the axle 9 by a bearing 81, by a one-way clutch 82 disposed radially outwardly of the right end of the rear hub 80. The one-way clutch 82 has a right end covered with a cover 83 provided between the driven sprocket 18 and the axle 9.

The one-way clutch 82 serves to transmit a torque for rotating the rear wheel $W_R$ in the normal direction A0 from the chain 19 to the rear wheel $W_R$. The one-way clutch 82 comprises an outer race 82a comprising the driven sprocket 18 operatively coupled to the chain 19, an inner race 82b fastened to the rear hub 80 by screws for rotation with the rear wheel $W_R$, a plurality of, ten in the present embodiment, circumferentially spaced rollers 82c disposed in an accommodating space S defined radially between the races 82a, 82b, a retainer 82d for keeping the circumferentially adjacent rollers 82c spaced circumferentially, and clutch springs 82e comprising compression springs disposed between the outer race 82a and the retainer 82d.

The retainer 82d comprises annular large- and small-diameter rings 82d1, 82d2 spaced from each other in the transverse direction of the bicycle, a plurality of, ten in the present embodiment, holders 82d3 coupled to the rings 82d1, 82d2 and extending in the transverse direction of the bicycle, the holders 82d3 being positioned between the circumferentially adjacent rollers 82c, and a positioner comprising protrusions 82d4 integrally formed with a pair of holders $82d3_1$ positioned in diametrically opposite relation to each other and extending through oblong holes 18a defined in the driven sprocket 18, the protrusions 82d4 projecting to the right from the oblong holes 18a. The protrusions 82d4 engage in engaging portions comprising recesses 83a defined in the cover 83, so that the cover 83 and the retainer 82d are rotatable in unison with each other.

Each of the rollers 82c can be brought into a state (locked state as indicated by the two-dot-and-dash lines in FIG. 11) in which it is wedged (locked) between a cam surface 82a1 on the inner circumferential surface of the outer race 82a and the inner race 82b for causing the outer race 82a and the inner race 82b to rotate in unison with each other, and a state (unlocked state) in which it is not wedged between the cam surface 82a1 and the inner race 82b for allowing the outer race 82a and the inner race 82b to rotate independently of each other. The oblong holes 18a are of such a shape as to provide a circumferential gap between themselves and the protrusions 82d4 so that the outer race 82a can rotate relatively to the retainer 82d by a predetermined angle θ 3 to be described later on.

The clutch springs 82e are disposed between a pair of diametrically opposite holders $82d3_2$ and the outer race 82a for normally biasing the holders $82d3_2$ into abutment against the outer race 82a in the normal direction A0 under their resilient forces. Specifically, the outer race 82a has a pair of recesses 82f defined in its inner circumferential surface at respective positions that radially confront the holders $82d3_2$, and the holders $82d3_2$ have protrusions n formed on their outer circumferential surfaces and placed in the respective recesses 82f.

The clutch springs 82e are disposed respectively in the recesses 82f. The clutch springs 82e have ends away from the normal direction A0 which are held against the outer race 82a and other ends toward the normal direction A0 which are held against the protrusions n. The clutch springs 82e thus normally bias the protrusions n into abutment against the outer race 82a in the normal direction under their resilient forces.

Because of the clutch springs 82e for applying resilient forces between the outer race 82a and the holders $82d3_2$, the outer race 82a and the retainer 82d take a first angular position (indicated by the solid lines in FIG. 11) in which the protrusions n abut against the outer race 82a in the normal direction A0 and the rollers 82c are in the unlocked state, except when the outer race 82a rotates in the normal direction A0.

The cover 83 covers an opening of the one-way clutch 82 to prevent lubricating oil in the accommodating space S from leaking out and also prevent foreign matter such as water, dust, etc. from entering the accommodating space S. The cover 83 is normally biased to move radially outwardly by resilient forces of an annular friction spring 85 which comprises a wire fixed to a shaft sleeve 84 fitted over and fixed to the axle 9.

The cover 83 is also held in slidable contact with the annular friction spring 85. In the one-way clutch 82, the gap between the outer circumferential surface of the cover 83 and the outer race 82a is hermetically sealed by a seal 86, the gap between the inner circumferential surface of the cover 83 and the shaft sleeve 84 is hermetically sealed by a seal 87, and the gap between the inner race 82b and the outer race 82a remote from the cover 83 is hermetically sealed by a seal 88.

The friction spring 85 is set under a load which is selected in magnitude to allow the outer race 82a to rotate through a predetermined angle θ 3 in the normal direction A0 with respect to the retainer 82d, causing the outer race 82a to elastically deform the clutch springs 82e immediately after having started to rotate in the normal direction A0, and which is also selected in magnitude to allow the cover 83 to rotate in unison with the retainer 82d, the outer race 82a (the driven sprocket 18), and the inner race 82b when the rollers 82c are in the locked state and the one-way clutch 82 are engaged.

Because of frictional forces between the cover 83 and the friction spring 85, there is no relative rotation cause between the axle 9 and the retainer 82d when the rollers 82c are in the unlocked state and the one-way clutch 82 which has been disengaged is brought into an engaged state immediately after the outer race 82a has started rotating in the normal direction A0. Therefore, the clutch springs 82e are compressed by the driven sprocket 18 (the outer race 82a) which rotates in the normal direction against the resilient forces of the clutch springs 82e, whereupon the outer race 82a and the retainer 82d takes a second angular position in which the outer race 82a has angularly moved the angle θ 3 with respect to the retainer 82d, with the retainer 82d being held to keep the rollers 82c in the locked state.

When the one-way clutch 82 is engaged, the retainer 82d and the outer race 82a (the driven sprocket 18) are maintained in the second angular position, and rotate in unison with the cover 83 and the inner race 82b. Therefore, the friction spring 85 and the cover 83 jointly make up a holding means for holding the retainer 82d to allow the outer race 82a to rotate through the angle θ 3 in the normal direction with respect to the retainer 82d immediately after the driven sprocket 18 has started rotating in the normal direction A0.

Due to the one-way clutch 82, when the driven sprocket 18 rotates in the normal direction A0, the rollers 82c are locked, causing the driven sprocket 18 and the rear hub 80 to rotate in unison with each other. When the driver stops pushing the pedals 13 while the bicycle B is running or when the bicycle B is moved forward with the driver not riding thereon, the driven sprocket 18 is rotated back in a direction opposite to the normal direction A0 by an angular interval commensurate with a slack in the chain 19 under the resiliency of the clutch springs 82e, and at the same time only the rear hub 80 rotates in the normal direction, thus unlocking the rollers 82c and disengaging the one-way clutch 82. With the driven sprocket 18 being stopped, only the rear wheel $W_R$, i.e., only the rear hub 80, rotates in the normal direction A0.

Figure 11:
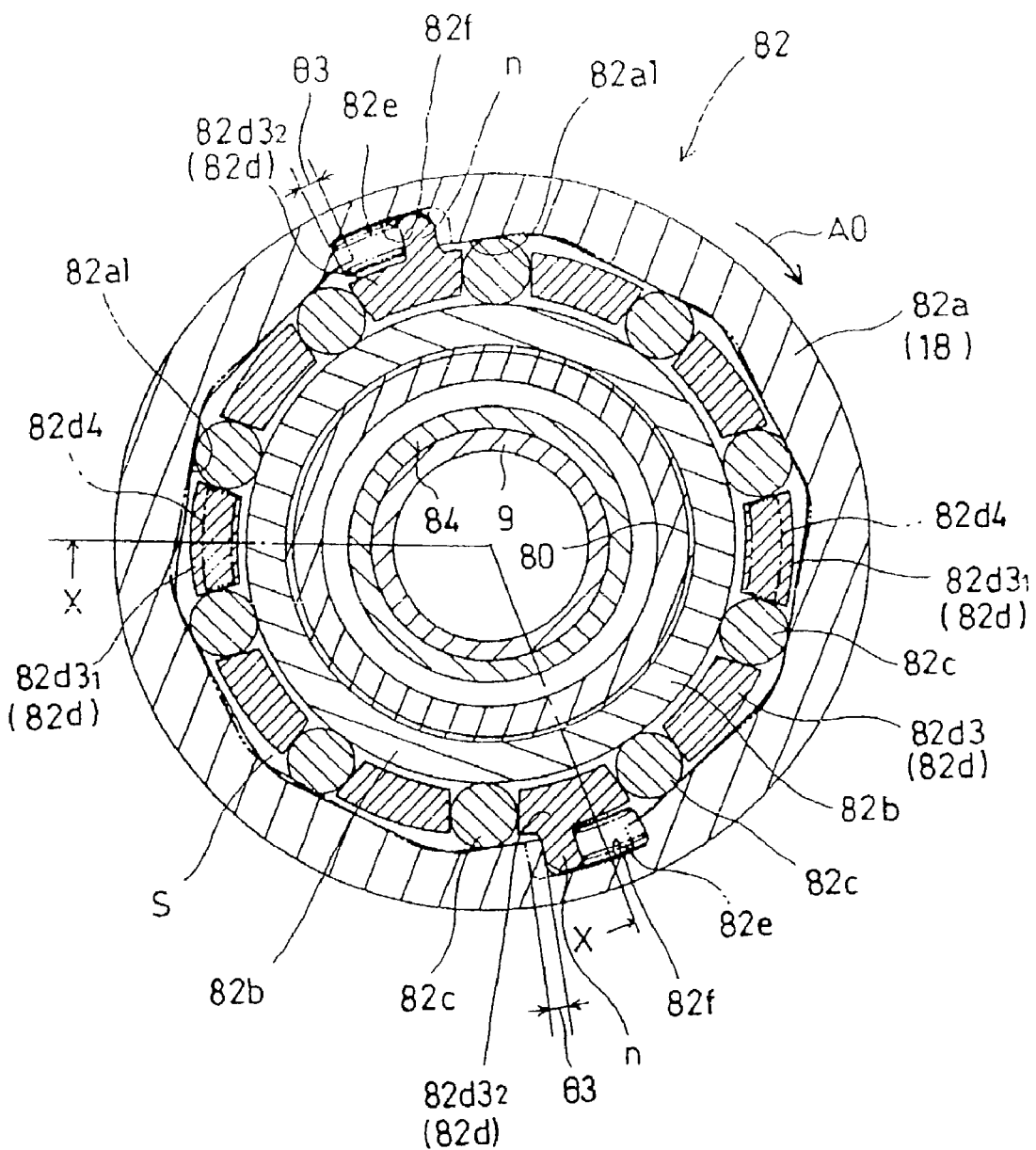
FIG. 11 is a cross-sectional view taken along line XI—XI of FIG. 10.

When the bicycle B is moved backward with the driver not riding thereon, for example, since the driven sprocket 18 has rotated in a direction opposite to the normal direction A0 by an angular interval commensurate with a slack in the chain 19 under the resiliency of the clutch springs 82e, the rollers 82c have been unlocked as shown in FIG. 11, thus disengaging the one-way clutch 82. Consequently, with the driven sprocket 18 being stopped, only the rear wheel $W_R$, i.e., only the rear hub 80, rotates in the backward direction.

Next, the operation of the continuously variable transmission T will be described.

While the bicycle B is running with the continuously variable transmission T being of a minimum speed change ratio, the third pivot shaft 53 is secured in position with the support member 51 held in abutment against the first stopper 67. While the input shaft 15 makes one revolution at this time, as shown in FIG. 12(a), the drive links 31 reciprocally move between illustrated positions P1, P2 per revolution of the input shaft 15 under the drive force applied from the input shaft 15, and the link units U1 through U4 successively swing the output links 33 through a swinging angular range θ 1. Since the link units U1 through U4 are operatively coupled to the output shaft 16 by the one-way clutch 36, the output shaft 16 is rotated successively by those of the four link units U1 through U4 which rotate the output shaft 16 at a maximum angular velocity (rotational speed) in the normal direction A0 per revolution of the input shaft 15, as shown in FIG. 13(a).

At the time when the rotational speed of the output shaft 16 is maximum, the rotational speed of the input shaft 15 is minimized by the variable-speed rotation transmitting mechanism M2 which employs the noncircular gears including the third drive gear 26 and the third driven gear 27. For example, upon a transition from the time when the link unit U1 drives the output shaft 16 to the time when the link unit U2 which is 90° out of phase with the link unit U1 drives the output shaft 16, i.e., at the time when the rotational speed of the output shaft 16 is minimum, the rotational speed of the input shaft 15 is maximized by the variable-speed rotation transmitting mechanism M2, reducing the range of changes in the rotational speed of the output shaft 16 and hence reducing its pulsations.

Figure 13A:
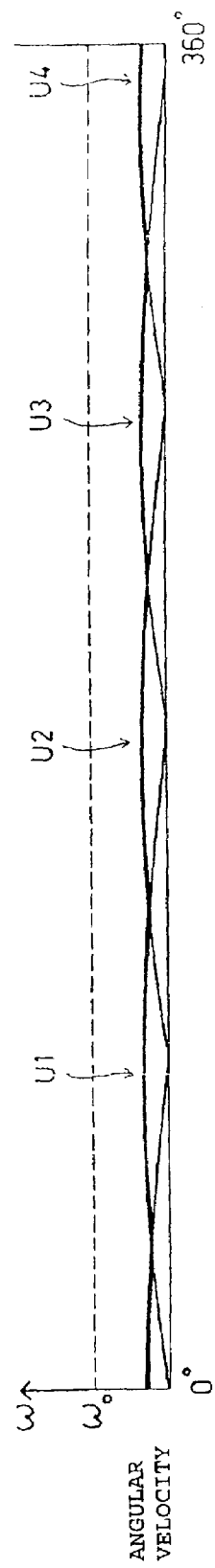
FIGS. 13(a) and (b) are diagrams illustrative of angular velocities of an output shaft of the continuously variable transmission shown in FIG. 1, FIG. 13(a) being illustrative of the angular velocities at a minimum speed change ratio, and FIG. 13(b) being illustrative of the angular velocities at a maximum speed change ratio.

In FIGS. 13(a) and (b), the reference characters U1 through U4 represent link units which are rotating the output shaft 16, and the reference characters $\omega_o$ a value indicative of a criterion for the magnitude of the angular velocity ω of the output shaft 16.

When the driver operates the transmission lever to make a shift-up from the operating state at the minimum speed change ratio, the control force is transmitted through the control wire 55, the drum 56, and the control shaft 57 to turn the retainer 58e of the two-way clutch 58 (see FIG. 9) in the up direction A2. At this time, as shown in FIG. 14(a), the torque Ta (the positive torque in FIGS. 14(a) and (b)) generated based on the component F, in the direction to accelerate the output shaft 16, of the drive force applied from the input shaft 15 to the link units U1 through U4 acts as an assistive force on the support shaft 59 through the transmission control links 54, the second intermediate link 62, and the first intermediate link 60.

Figure 15:
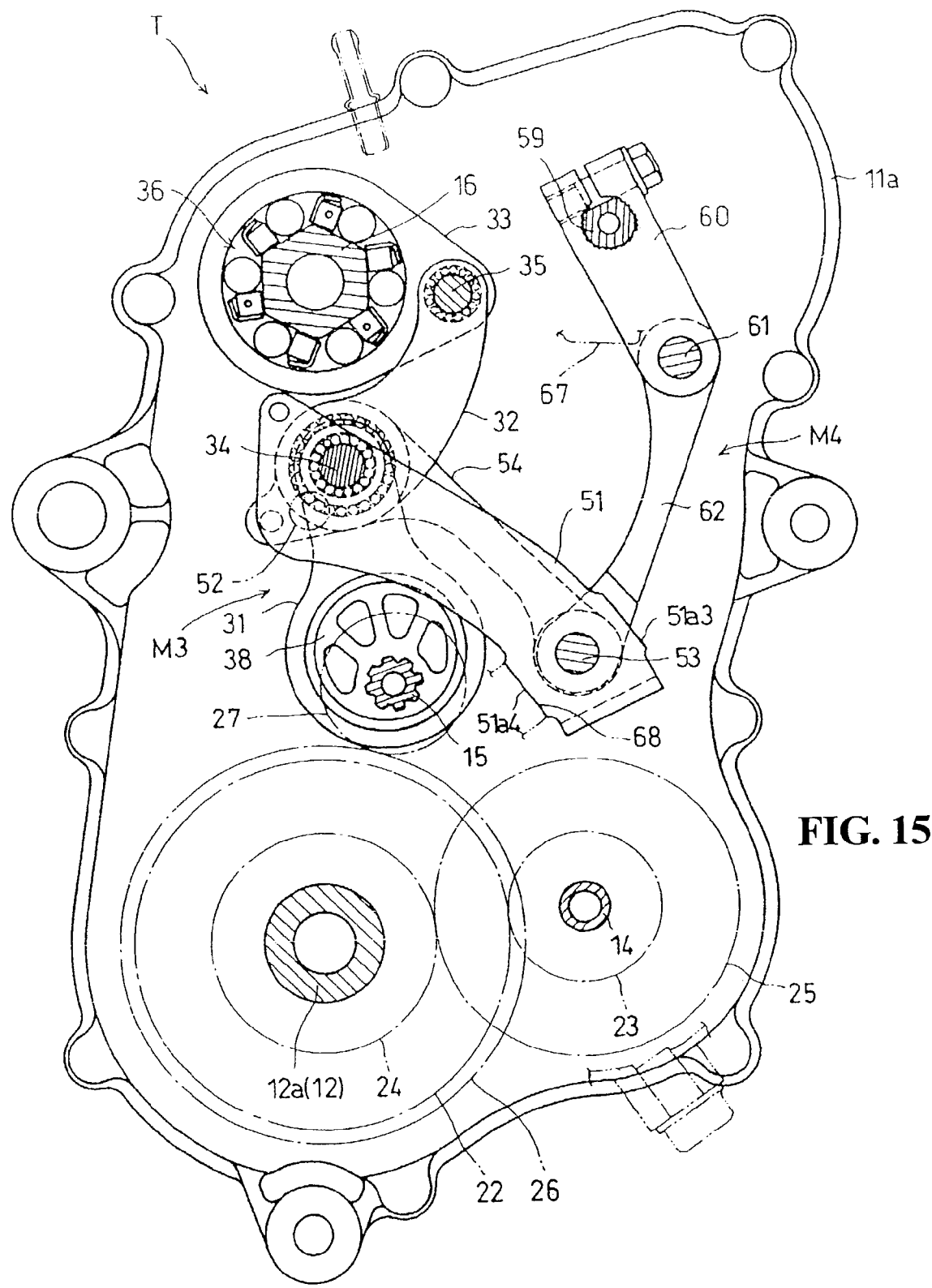
FIG. 15 is a right side elevational view similar to FIG. 3, showing the continuously variable transmission which is at a minimum speed change ratio.

The support shaft 59 is angularly moved to cause the third pivot shaft 53 and the proximal ends 54b of the transmission control links 54 to move along an arcuate speed change path about the central shaft 52 on which the support member 51 is supported, toward the position at the maximum speed change ratio shown in FIG. 15, for thereby rotating the rear wheel $W_R$ at a larger speed change ratio.

As shown in FIG. 12(b), while the input shaft 15 makes one revolution with the transmission control links 54 and the third pivot shaft 53 being at the maximum speed change ratio (see FIG. 15), the drive links 31 reciprocally move between illustrated positions P3, P4 per revolution of the input shaft 15, and the link units U1 through U4 swing the respective output links 33 through a swinging angular range θ 2 which is larger than the swinging angular range θ 1 at the minimum speed change ratio.

Figure 13B:
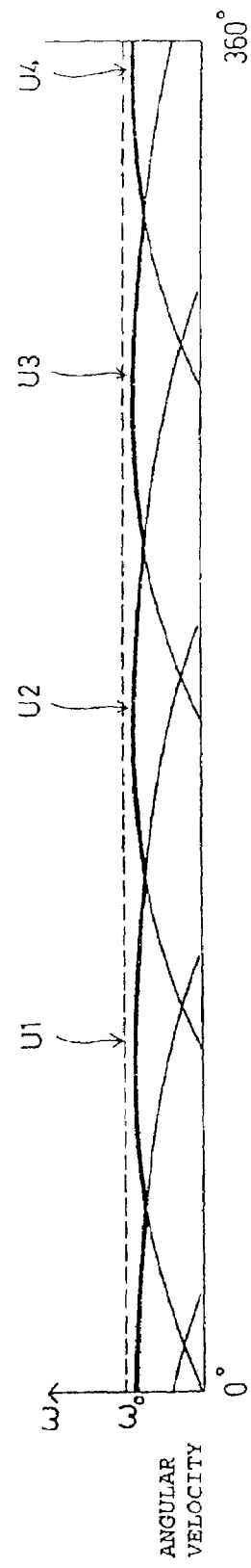

The output shaft 16 is rotated successively by those of the four link units U1 through U4 which rotate the output shaft 16 at a maximum angular velocity (rotational speed) in the normal direction A0 per revolution of the input shaft 15, as shown in FIG. 13(b). At this time, too, as with the operation at the minimum speed change ratio, the variable-speed rotation transmitting mechanism M2 reduces the range of changes in the rotational speed of the output shaft 16 and hence reduce its pulsations.

Figure 14B:
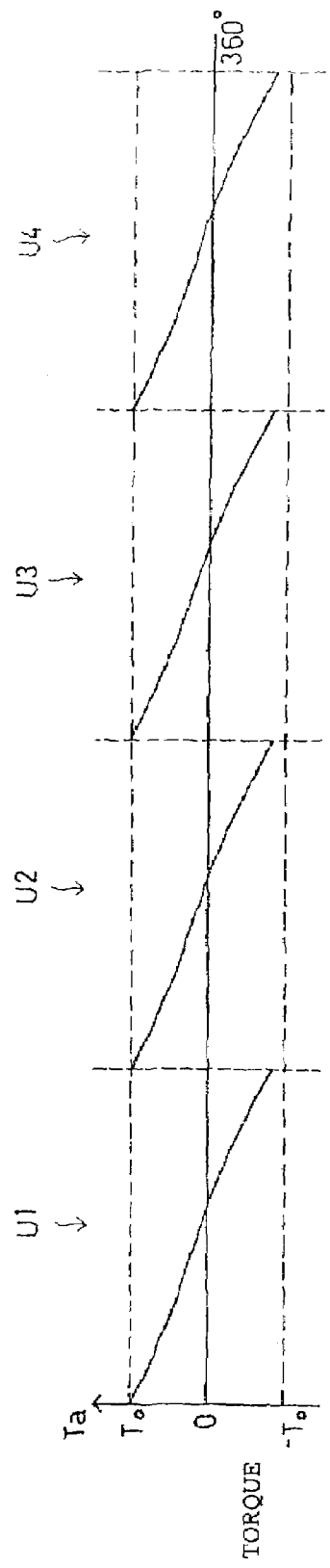

When the driver operates the transmission lever to make a shift-down from the operating state at the maximum speed change ratio, the control force is transmitted through the control wire 55, the drum 56, and the control shaft 57 to turn the retainer 58e of the two-way clutch 58 (see FIG. 9) in the down direction A3. At this time, as shown in FIG. 14(b), the torque Ta (the negative torque in FIGS. 14(a) and (b)) generated based on the component F, in the direction to decelerate the output shaft 16, of the drive force applied from the input shaft 15 to the link units U1 through U4 acts as an assistive force on the support shaft 59. The support shaft 59 is angularly moved to cause the third pivot shaft 53 and the proximal ends 54b to move along the arcuate speed change path from the position at the maximum speed change ratio toward the position at the minimum speed change ratio, for thereby rotating the rear wheel $W_R$ at a smaller speed change ratio.

In this manner, since the third pivot shaft 53 that is swingable about the central shaft 52 can continuously take any position between the position at the minimum speed change ratio and the position at the maximum speed change ratio based on the speed change operation of the transmission control mechanism M4, the rotational speed of the crankshaft 12 is continuously varied and transmitted to the rear wheel $W_R$.

Effects and advantages of the embodiment thus constructed as described above will be described below.

Because the continuously variable transmission T is disposed between the front wheel $W_F$ and the rear wheel $W_R$ and either upwardly of the hypothetical plane H2 which contains the axes of rotation of the front wheel $W_F$ and the rear wheel $W_R$ or upwardly of the position below and near hypothetical plane H2, the continuously variable transmission T is positioned closer to the center of gravity of the bicycle and remoter from the ground than the prior art.

Consequently, the maneuverability of the bicycle B is improved, and the continuously variable transmission T suffers almost no danger of contacting the ground. As the drive links 31 of the link units U1 through U4 are pivotally supported on the eccentric ring 38 which is coupled to the input shaft 15, the range of angular movement of the drive links 31 can be changed to change the range of speed change ratios with ease by replacing the eccentric ring 38. Inasmuch as the input shaft 15 can be used as a common part, the cost of the continuously variable transmission T can be reduced.

The drive sprocket 17 coupled to the end of the output shaft 16 outside of the case 11 of the continuously variable transmission T and the continuously variable transmission T are disposed upwardly of the lowermost end 3$a$1 of the down tube 3.

Therefore, the drive sprocket 17 positioned outside of the continuously variable transmission T and the continuously variable transmission T are prevented from contacting the ground by the lowermost end 3$a$1 of the down tube 3 which is positioned lower than the drive sprocket 17 and the continuously variable transmission T. It is thus possible to further avoid contact of the continuously variable transmission T and the drive sprocket 17 with the ground.

The speed increasing gear train which is mounted on the crankshaft 12 and the idle shaft 14 for increasing the rotational speed of the crankshaft 12 and transmitting the rotation at the increased speed to the input shaft 15 are disposed in the case 11 of the continuously variable transmission T.

Thus, the speed increasing mechanism M1 for increasing the rotational speed of the crankshaft 12 and transmitting the rotation at the increased speed to the input shaft 15 comprises the speed increasing gear train mounted on the crankshaft 12 and the idle shaft 14 in the case 11 of the continuously variable transmission T. The speed increasing mechanism M1 is made compact, and the layout of the speed increasing mechanism M1 with respect to the bicycle frame R and hence the layout of the continuously variable transmission T with respect to the bicycle frame R have increased freedom.

The input shaft 15 and the output shaft 16 are operatively connected to each other by the link units U1 through U4 each comprising a plurality of links. Therefore, the layout of the output shaft 16 with respect to the crankshaft 12 and hence the bicycle frame R has increased freedom. Therefore, even though the rear wheel $W_R$ is supported by the swing arms 8 that are vertically swingable, the output shaft 16 can be disposed in the vicinity of the hypothetical plane H1 containing the pivot shaft 7 with respect to the bicycle frame R.

Inasmuch as the speed increasing mechanism M1 disposed between the crankshaft 12 and the input shaft 15 includes the variable-speed rotation transmitting mechanism M2, pulsations in the rotational speed of the output shaft 16 are reduced for comfortable running performance. Because the speed increasing mechanism M1 is used to reduce pulsations, the continuously variable transmission T is prevented from increasing its weight, the input shaft 15 is not elongated in the direction of its axis of rotation for reducing pulsations, and the continuously variable transmission T is prevented from increasing its size in the direction of the axis of rotation of the input shaft 15.

The variable-speed rotation transmitting mechanism M2 comprises the speed increasing gear train having the drive gear 26 and the driven gear 27 as a pair of noncircular gears. Consequently, pulsations in the rotational speed of the output shaft 16 are reduced by a simple arrangement. The driven gear 27 is coupled to the input shaft 15 between the link unit U1 that is closest to the bearing 30$b$ by which the input shaft 15 is rotatably supported and the link unit U2 adjacent to the link unit U1, and keeps the link units U1, U2 spaced from each other along the axis of rotation of the input shaft 15.

Since the driven gear 27 doubles as a spacer for arraying the link units U1, U2 on the input shaft 15, the number of spacers used is reduced and the continuously variable transmission T is prevented from increasing its weight. Since any flexing of the input shaft 15 due to a load applied to the driven gear 27 is small though the final gear of the speed increasing mechanism M1 is the single drive gear 27, the link units U1 through U4 operate smoothly, and the input shaft 15 is prevented from increasing its diameter for the purpose of increasing the rigidity thereof, so that the continuously variable transmission T is prevented from increasing its weight.

The first and second pivot shafts 34, 35 of the link units U1 through U4 which are arrayed on the input shaft 15 along its axis of rotation have the needle bearings 40, 41, 63 free of retainers, and two of the drive links 31, the transmitting links 32, the output links 33, and the transmission control links 54 are relatively angularly movably supported by the needle bearings 40, 41, 63. As the links 31, 32, 33, 54 supported by these needle bearings 40, 41, 63 are angularly moved smoothly, the continuously variable transmission T operates smoothly for speed changes. The first and second pivot shafts 34, 35 which have the needle bearings 40, 41, 63 have their size reduced in the direction of the axes of the needles 40$c$, 41$a$, 63$a$, i.e., in the direction of the axis of rotation of the input shaft 15 (the transverse direction of the bicycle), by a retainer-free dimension. Therefore, the space occupied by the link units U9 through U4 in the direction of the axis of rotation of the input shaft 15 is also reduced, resulting in a reduction in the size of the continuously variable transmission T.

The retainer-free needle bearings 40, 63 are stacked radially on the first pivot shaft 34 and disposed coaxially therewith, and the drive links 31, the transmitting links 32, and the transmission control links 54 are relatively angularly movably supported on the first pivot shaft 34. Therefore, though two bearings are provided and three links are supported on one pivot support, the size of the first pivot shaft 34 in the in the direction of the axis of rotation of the input shaft 15 on which the drive links 31, the transmitting links 32, and the transmission control links 54 are supported is reduced because the two needle bearings 40, 63 have no retainers and the bearings 40, 63 are stacked radially on the first pivot shaft 34.

The needles 40$c$, 41$a$, 63$a$ of the needle bearings 40, 41, 63 are prevented from moving axially by the drive links 31 or the transmission links 32 supported by the first and second pivot shafts 34, 35 having the needle bearings 40, 41, 63. Therefore, the needles 40$c$, 41$a$, 63$a$ are reliably prevented from being displaced out of position without involving an increase in the number of parts used.

The transmitting mechanism MS for transmitting the control force for a speed change operation to the third pivot shaft 53 converts the torque Ta generated based on the component F of the drive force that is transmitted through the transmission control links 54 to actuate the link units U1 through U4, into an assistive force for assisting the control force. Therefore, based on the reciprocating movement of the drive links 31 that are actuated by the drive force produced by the input shaft 15 which is rotated by the crankshaft 12, the control force required for a speed change operation at the time the driver pushes the pedals 13 to rotate the crankshaft 12 is reduced, making it possible to perform the speed change operation lightly.

Since the transmitting mechanism M5 has the two-way clutch 58 for preventing the support shaft 59 from angularly moving under a force applied from the transmission mechanism M3 and allowing the support shaft 59 to angularly move under a control force applied from the control lever, the continuously variable transmission T is capable of reliably making speed changes while the bicycle B is running as well as it is being stopped.

The drive link 31 of the link unit U1 on the right end, which is one of the drive links 31 pivotally mounted on the input shaft 15 is disposed between the first drive gear 22 and the third drive gear 26, which make a pair of respective speed increasing stages of the speed increasing mechanism M1, in the transverse direction of the bicycle, and is disposed in a position overlapping the first drive gear 22 and the third drive gear 26 in the radial direction of the main shaft 12*a*. Consequently, the continuously variable transmission T is reduced in size in the transverse direction of the bicycle. Furthermore, the interaxial distance between the crankshaft 12 and the input shaft 15 can be reduced, also contributing to a reduction in the size of the continuously variable transmission T.

The control force for continuously varying the rotational speed of the output shaft 16 is transmitted to the pivot shaft 53 mounted on the support member 51 and on which the transmission control links 54 are pivotally mounted, through the second intermediate link 62 of the link mechanism pivotally mounted on the pivot shaft 53. Therefore, as the control force for swinging the pivot shaft 53 is directly applied to the pivot shaft 53 on which the transmission control links 54 are pivotally mounted, thus swinging the pivot shaft 53 with the support member 51 around the central shafts 52, the support member 51 is not required to have a portion for bearing the control force, so that the support member 51 and hence the continuously variable transmission T can be reduced in size and weight. By suitably setting the lengths of the first and second intermediate links 60, 62 of the link mechanism, the support member 51 is not required to have its size and weight increased even when the speed change ratio is varied over a wide range. In addition, the range in which the pivot shaft 53 swings can easily be increased, and the speed at which the pivot shaft 53 swings can be increased, so that the speed change ratio can quickly be varied.

In order to array all the transmission control links 54 supported on the third pivot shaft 53 at equally spaced intervals in the transverse direction of the bicycle, the collar 70 and the second intermediate link 62 supported on the third pivot shaft 53 are used to keep adjacent ones of the transmission control links 54 spaced from each other. Consequently, the number of collars for use as spacers is reduced, and the width of the support member 51 which supports the third pivot shaft 53 and the length of the input shaft 15 in the transverse direction of the bicycle are reduced, resulting in a reduction in the sizes of the support member 51 and the input shaft 15 and hence the continuously variable transmission T in the transverse direction of the bicycle.

The one-way clutch 82 has the clutch springs 82*e* for exerting resilient forces between the outer race 82*a* and the retainer 82*d* in order to bring the rollers 82*c* into the unlocked state except when the outer race 82*a* rotates in the normal direction A0, and the holding means for holding the retainer 82*d* to lock the rollers 82*c* when the outer race 82*a* elastically deforms the clutch springs 82*e* and is allowed to rotate through the angle θ 3 in the normal direction A0 with respect to the retainer 82*d* immediately after having started rotating in the normal direction A0. The one-way clutch 82 is engaged immediately after the outer race 82*a* actuated by the chain 19 has started rotating from a stop through the angle θ 3 in the normal direction A0, allowing the inner race 82*b* and the retainer 82*d* to rotate with the outer race 82*a* in the normal direction A0. When the rotation of the outer race 82*a* in the normal direction A0 is stopped, the driven sprocket 18 is rotated back in a direction opposite to the normal direction A0 by an angular interval commensurate with a slack in the chain 19 under the resiliency of the clutch springs 82*e*, and at the same time only the rear hub 80 rotates in the normal direction, thus unlocking the rollers 82*c*.

When the bicycle B is moved backward with the driver not riding thereon, the rear wheel $W_R$ is rotated backward. Since the rollers 82*c* have been in the unlocked state under the resiliency of the clutch springs 82*e*, the one-way clutch 82 is disengaged. The rotation of the rear wheel $W_R$ is transmitted to the outer race 82*a*, but not to the continuously variable transmission T and also to the crankshaft 12. The continuously variable transmission T is thus protected.

The backward rotation of the rear wheel $W_R$ is not transmitted to the continuously variable transmission T and the crankshaft 12. The holding means for holding the retainer 82*d* in order to engage the one-way clutch 82 immediately upon rotation of the driven sprocket 18 in the normal direction A0 can be constructed of a simple structure using the cover 83 covering the opening of the one-way clutch 82 and the friction spring 85 and utilizing frictional forces between the cover 83 and the friction spring 85.

Because the protrusions n of the retainer 82*d* and the clutch springs 82*e* are accommodated in the recesses 82*f* defined in the inner circumferential surface of the outer race 82*a* of the one-way clutch 82, the one-way clutch 82 is prevented from increasing its size due to the clutch springs 82*e*.

An embodiment based on a modification of the arrangement of the embodiment described above will be described below with respect to the modified arrangement.

In the above embodiment, the variable-speed rotation transmitting mechanism M2 comprises noncircular gears. However, the variable-speed rotation transmitting mechanism M2 may comprise members for producing variable-speed rotation, such as eccentric gears or the like. The speed increasing mechanism M1 may have a plurality of speed increasing stages except three speed increasing stages or may have a single speed increasing stage. The bicycle may be a bicycle other than a downhill bicycle, or may be replaced with a tricycle. The endless transmission belt and the drive and driven rotors of the transmitting mechanism may be a belt and pulleys, respectively.

In the above embodiment, the support ring 51*a* comprises a single member having the pair of sides 51*a*1 and the joint 51*a*2. However, the support ring 51 a may be a joined assembly of the pair of sides and the joint which are provided as three separator members.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A continuously variable transmission adapted to be disposed on a bicycle frame of a bicycle in a position between front and rear wheels of the bicycle in a longitudinal direction thereof and substantially upwardly of a plane which contains an axis of rotation of said front wheel and an axis of rotation of said rear wheel, the continuously variable transmission comprising:
   a transmission mechanism having a plurality of link units, each comprising a plurality of transmission links, for converting rotary motion of an input shaft rotated by a pedal-operated crankshaft into swinging motion;
   a one-way clutch coupled to each of said link units for converting the swinging motion of the link units into rotary motion of an output shaft; and
   a transmission control mechanism for moving an end of a transmission control link having an opposite end pivotally coupled to each of said link units thereby to continuously vary the rotational speed of said output shaft,
   wherein a drive link of said transmission links of each of said link units is pivotally supported on an eccentric ring coupled to said input shaft for rotation in unison therewith.

2. The continuously variable transmission according to claim 1, wherein a drive rotor on which an endless transmission belt for transmitting power is trained is coupled to an end of said output shaft outside of a case of the continuously variable transmission, said drive rotor and said continuously variable transmission being disposed upwardly of a lowermost end of the bicycle frame.

3. The continuously variable transmission according to claim 1, wherein said crankshaft, an idle shaft disposed parallel to said crankshaft, and a speed increasing gear train which is mounted on said crankshaft, and said idle shaft for increasing the rotational speed of said crankshaft and transmitting the rotation at the increased speed to said input shaft are disposed in a case of the continuously variable transmission.

4. The continuously variable transmission according to claim 1, wherein the output shaft is disposed adjacent to a plane which contains central axes of a rear axle and a pivot shaft.

5. The continuously variable transmission according to claim 2, wherein the continuously variable transmission is disposed substantially upwardly of a lowermost end of a down tube of the bicycle frame.

6. The continuously variable transmission according to claim 5, wherein the continuously variable transmission is supported by a pivot shaft on the down tube of the bicycle frame.

7. The continuously variable transmission according to claim 3, wherein the idle shaft is disposed in the case forwardly of the crankshaft.

8. The continuously variable transmission according to claim 1, wherein the input shaft is used as a common part, and a range of angular movement of the drive link can be changed to change a range of speed change ratios by replacing the eccentric ring.

9. The continuously variable transmission according to claim 1, wherein the input shaft and the output shaft are operatively connected to each other by the plurality of link units.

10. The continuously variable transmission according to claim 4, wherein the rear wheel is supported by a pair of swing arms so as to be vertically swingable and the output shaft is disposed in the vicinity of the hypothetical plane containing the central axes of the pivot shaft and the rear axle.

11. A bicycle with a continuously variable transmission comprising:
    a pair of right and left main frames extending rewardly and downwardly from a head pipe;
    a down tube extending obliquely downwardly from front ends of the main frames below the main frames;
    a transmission mechanism having a plurality of link units, each comprising a plurality of transmission links, for converting rotary motion of an input shaft rotated by a pedal-operated crankshaft into swinging motion;
    a one-way clutch coupled to each of said link units for converting the swinging motion of the link units into rotary motion of an output shaft; and
    a transmission control mechanism for moving an end of a transmission control link having an opposite end pivotally coupled to each of said link units thereby to continuously vary the rotational speed of said output shaft,
    wherein a drive link of said transmission links of each of said link units is pivotally supported on an eccentric ring coupled to said input shaft for rotation in unison therewith, said continuously variable transmission being disposed between front and rear wheels of the bicycle in a longitudinal direction thereof and substantially upwardly of a hypothetical plane which contains the axis of rotation of said front wheel and the axis of rotation of said rear wheel.

12. The bicycle according to claim 11, wherein a drive rotor on which an endless transmission belt for transmitting power is trained is coupled to an end of said output shaft outside of a case of the continuously variable transmission, said drive rotor and said continuously variable transmission being disposed upwardly of a lowermost end of a bicycle frame.

13. The bicycle according to claim 11, wherein said crankshaft, an idle shaft disposed parallel to said crankshaft, and a speed increasing gear train which is mounted on said crankshaft, and said idle shaft for increasing the rotational speed of said crankshaft and transmitting the rotation at the increased speed to said input shaft are disposed in a case of the continuously variable transmission.

14. The bicycle according to claim 11, wherein the output shaft is disposed adjacent to a hypothetical plane which contains central axes of a rear axle and a pivot shaft, a pair of swing arms being movably supported on the pivot shaft.

15. The bicycle according to claim 12, wherein the continuously variable transmission is disposed substantially upwardly of a lowermost end of the down tube of the bicycle frame.

16. The bicycle according to claim 15, wherein the continuously variable transmission is supported by a pivot shaft on the down tube of the bicycle frame.

17. The continuously variable transmission according to claim 13, wherein the idle shaft is disposed in the case forwardly of the crankshaft.

18. The continuously variable transmission according to claim 11, wherein the input shaft is used as a common part, and a range of angular movement of the drive link can be changed to change a range of speed change ratios by replacing the eccentric ring.

19. The continuously variable transmission according to claim 11, wherein the input shaft and the output shaft are operatively connected to each other by the plurality of link units.

20. The continuously variable transmission according to claim 14, wherein the rear wheel is supported by a pair of swing arms so as to be vertically swingable and the output shaft is disposed in the vicinity of the hypothetical plane containing the central axes of the pivot shaft and the rear axle.

* * * * *